United States Patent [19]

Teare et al.

[11] Patent Number: 6,151,624
[45] Date of Patent: Nov. 21, 2000

[54] NAVIGATING NETWORK RESOURCES BASED ON METADATA

[75] Inventors: Keith Teare, Palo Alto; Nicolas Popp, Menlo Park; Bruce Ong, San Francisco, all of Calif.

[73] Assignee: RealNames Corporation, Palo Alto, Calif.

[21] Appl. No.: 09/017,817

[22] Filed: Feb. 3, 1998

[51] Int. Cl.[7] .................................................. G06F 13/14
[52] U.S. Cl. ................................ 709/217; 707/5; 707/522
[58] Field of Search ................................ 707/502, 1, 3, 707/4, 5, 104; 709/217, 218, 202, 203, 219

[56] References Cited

U.S. PATENT DOCUMENTS

| | | | |
|---|---|---|---|
| 4,677,588 | 6/1987 | Benjamin et al. | 364/900 |
| 4,718,005 | 1/1988 | Feigenbaum et al. | 364/200 |
| 4,914,571 | 4/1990 | Baratz et al. | 364/200 |
| 5,282,244 | 1/1994 | Fuller et al. | 379/230 |
| 5,388,213 | 2/1995 | Oppenheimer et al. | 395/200 |
| 5,410,691 | 4/1995 | Taylor | 395/600 |
| 5,412,714 | 5/1995 | Bogart et al. | 379/221 |
| 5,434,974 | 7/1995 | Loucks et al. | 395/200 |
| 5,475,819 | 12/1995 | Miller et al. | 395/200.03 |
| 5,548,722 | 8/1996 | Jalalian et al. | 395/200.1 |
| 5,586,257 | 12/1996 | Perlman | 463/42 |
| 5,727,129 | 3/1998 | Barrett et al. | 395/12 |
| 5,729,682 | 3/1998 | Marquis et al. | 395/200.12 |
| 5,740,422 | 4/1998 | Foltz et al. | 395/609 |
| 5,751,961 | 5/1998 | Smyk | 395/200.47 |
| 5,764,906 | 6/1998 | Edelstein et al. | 395/200.49 |

FOREIGN PATENT DOCUMENTS

| | | |
|---|---|---|
| WO97/19564 | 5/1997 | WIPO . |
| WO97/32251 | 9/1997 | WIPO . |

OTHER PUBLICATIONS

Berkeley Digital Library SunSITE, "SICI: Serial Item and Contribution Identifier Standard," http://sunsite.berkeley.edu/SICI/, "last revision date" Dec. 1, 1997.

Qu, et al., "A Practical Method for Achieving Portable Communications in the Internet Context," 1995 IEEE publication, pp. 1512–1516.

W3C Architecture Domain, "Naming and Addressing: URIs, http://www.w3.org/Addressing, "creation date 1993, "last revision date" Jun. 8, 1998.

Juan M. Andrade, Mark T. Carges, M. Randall MacBlane, "Open On–line Transaction Processing with the TUXEDO System," IEEE, pp. 366–371, Feb., 1992.

Daniel LaLiberte, Michael Shapiro, Internet–Draft, "The Path URN Specification," http://www.hypernews.org/~liberte/www/path.html, "expiration date" Jan. 1, 1996.

Ralph E. Droms, "Access to Heterogeneous Directory Services," IEEE, pp. 1054–1061, Jun., 1990.

(List continued on next page.)

*Primary Examiner*—Dung C. Dinh
*Attorney, Agent, or Firm*—Hickman Palermo Troung & Becker LLP; Christopher J. Palermo

[57] ABSTRACT

Mechanisms for associating metadata with network resources, and for locating the network resources in a language-independent manner, are disclosed. Owners of network resources define metadata that describes each network resource. The metadata may include a natural language name of the network resource, its location, its language, its region or intended audience, and other descriptive information. The owners register the metadata in a registry. A copy of the metadata is stored on a server associated with a group of the network resources. A copy of the metadata is stored in a registry that is indexed at a central location. A crawler service periodically updates the registry by polling the information on each server associated with registered metadata. To locate a selected network resource, a client provides the name of the network resource to a resolver process. The resolver process provides to the client the network resource location corresponding to the network resource name. Multiple metadata mappings can be established for the same network resource, in which each mapping stores a name expressed in a different natural language. Accordingly, network resources can be located merely by providing the name of the network resource in any natural language that is convenient for the client.

3 Claims, 13 Drawing Sheets

OTHER PUBLICATIONS

Michael Hitchens, John Rosenberg, "Bindings between Names and Objects in a Persistent System," IEEE, pp. 26–37, Sep., 1992.

Laurence W. Lannom, Defense Virtual Library, http://wwww.cnri.reston.va.us/dtic.html, "creation date" Sep. 8, 1997.

The International DOI Foundation, "The Digital Object Identifier (DOI) System,"http://wwww.doi.org/index.html and http://www.doi.org/syntax.html, "last revision date" Sep. 22, 1998, retrieval.

Edward Slottow, "Engineering a Global Resolution Service," http://ana–www.lcs.mit.edu/anaweb/html–papers/edward–MEng/proposal.html, "creation date" Nov. 26, 1996.

CNRI Presents Grail, "Grail Home Page," http://grail.cnri.reston.va.us/grail/.

Mark S. Squillante, David Notkin, "Integrating Heterogeneous Local Mail Systems," IEEE, pp. 59–67, Nov., 1989.

The Corporation for National Research Initiatives (CNRI), Handle System—Handle System Administration Protocol Specification, http://www.handle.net/handle admin.html, pp. 1–36.

The Corporation for National Research Initiatives (CNRI), "Handle System—Handle Server Components Briefing," http://www.handle.net/overviews/server–components.html, "last revision date" Aug. 13, 1998.

Persistent URL Home Page, http://purl.oclc.org.

Stuart Weibel, Erik Jul, Keith Shafer, "PURLs: Persistent Uniform Resource Locators," http://purl.oclc.org/OCLC/PURL/Summary, "creation date" Nov./Dec., 1995.

Tonya Beeton, "National Library Announces a PURL of a Service," http://www.nla.gov.au/pressurel/purll.html, "last revision date"Jan. 29, 1998.

"PURL–PC Webopaedia Definition and Links," http://webopedia.internet.com/TERM/P/PURL.html, "last revision date" Aug. 4, 1998.

"URL Integrity," http://sunsite.berkeley.edu/~emorgan/waves/urlintegrity.html, "last revision date" Feb. 19, 1998.

J. Postel, "Domain Name System Structure and Delegation," RFC #1591, "creation date" Mar., 1994.

R. Austein, J. Saperia, "DNS Resolver MIB Extensions," RFC #1612, "creation date" May, 1994.

T. Berners–Lee, "Universal Resource Identifiers in WWW," RFC #1630, "creation date" Jun., 1994.

S. Kille, "Using the OSI Directory to Achieve User Friendly Naming," RFC #1781, "creation date" Mar., 1995.

R. Moats, "URN Syntax," RFC #2141, "creation date" May, 1997.

R. Daniel, "A Trivial Convention for using HTTP in URN Resolution," RFC #2169, "creation date" Jun., 1997.

William Y. Arms, D–Lib Magazine, "Key Concepts in the Architecture of the Digital Library," http://www.cnri.reston.va.us/home/dlib/July95/07arms.html, "creation date" Jul., 1995.

The URN Implementors, D–Lib Magazine, "Uniform Resource Names," http://www.dlib.org/dlib/february96/02arms.html, "creation date" Feb., 1996.

William Y. Arms, Christophe Blanchi, Edward A. Overly, D–Lib Magazine, "An Architecture for Information in Digital Libraries," http://www.dlib.org/dlib/february97/cnri/02arms1.html, "creation date" Feb., 1997.

L. Peter Deutsch, "Host Names On–line," RFC #606, "creation date" Dec., 1973.

Debra P. Deutsch, "A Suggested Solution to the Naming, Addressing, and Delivery Problem for ARP Anet Message Systems," RFC #757, "creation date" Sep. 10, 1979.

K. Harrenstien, M. Stahl, E. Feinler, "NICNAME/WHOIS," RFC #954, "creation date" Oct., 1995.

P. Mockapertris, "Domain Names–Concepts and Facilities," RFC #1034, "creation date" Nov., 1987.

S.E. Hardcastle–Kille, "X.500 and Domains," RFC #1279, "creation date" Nov., 1991.

Waldbaum et al., Brief for Appellant Netword, LLC, in *Netword, LLC v. Centraal Corporation*, Appeal No. 99–1257, United States Court of Appeals for the Federal Circuit, dated Apr. 30, 1999.

Noah et al., Brief of Defendant/Appellee Centraal Corporation, in *Netword, LLC v. Centraal Corporation*, Appeal No. 99–1257, United States Court of Appeals for the Federal Circuit, dated Jun. 11, 1999.

Waldbaum et al., Reply Brief for Appellant Netword, LLC, in *Netword, LLC v. Centraal Corporation*, Appeal No. 99–1257, United States Court of Appeals for the Federal Circuit, dated Jun. 25, 1999.

Netword, LLC v. Centraal Corporation, Civil Action No. 98–1023–A, United States District Court For The Eastern District Of Virginia, Alexandria Division, 1999 U.S. Dist. LEXIS 1957.

Shafer, et al. "Introduction to Persistent Uniform Resource Locators," http://purl.oclc.org/OCLC/PURL/INET96, printed Aug. 25, 1998.

NAVIGATING NETWORK RESOURCES BASED ON METADATA

FIELD OF THE INVENTION

The present invention generally relates to data processing, and relates specifically to methods and computer systems for managing names of network resources and locating the resources.

BACKGROUND OF THE INVENTION

Recently, a global packet-switched network known as the Internet has attracted wide use. A local computer can connect to a distant server, request a file or an image from the server, and receive the requested information immediately.

The Internet operates according to several standard protocols. For example, packets of data are communicated among Internet host computers ("servers") using the Transmission Control Protocol (TCP) and Internet Protocol (IP).

Each server that is accessible using the Internet or connected to the Internet is associated with a unique numeric identifier called an IP address. Each IP address has four numeric parts, and each part has a value in the range 0 to 255. An example IP address is "204.93.112.93". The IP addresses are assigned and managed by a central Internet Assigned Names Authority. Numeric identifiers are rapidly and conveniently processed by computers, but are inconvenient for humans to remember and type.

Accordingly, in 1984 the Domain Name System (DNS) was introduced. DNS is a distributed information database that maps the IP address of a server to a host name or "domain name". For example, the domain name www.centraal.com is mapped to the IP address 209.76.153.3 in the DNS system. The database is available at several computer systems around the world known as DNS servers. A local computer can look up a remote server by connecting to a DNS server, providing a domain name to the DNS server, and obtaining the IP address that corresponds to the domain name. The local computer can then connect to the remote computer using the IP address, and send and receive information.

Generally domain names comprise two or more alphanumeric fields, separated by periods. The right-most field is the generic top-level domain (gTLD) name. The "com" portion of the domain name "centraal.com" is a generic top-level domain name that indicates that "centraal.com" is a commercial domain. Other gTLD's include "mil" (for military domains), "gov" (for government domains), and "edu" (for domains of educational institutions). Still other gTLDs have been proposed for creation.

The "centraal" portion of "centraal.com" is a second level domain name or organization name. Usually the second level domain name is also the name of a specific network server or host at the institution that owns the domain name. Domain names also can have third-level domain names, such as "www", that identify a sub-domain of the organization, such as a sub-directory of the network server, or a specific computer or workstation.

Domain names may also incorporate geographic portions. An example is the domain name "rcsd.redwood-city.ca.us". The "us" portion indicates the United States; the "ca" portion refers to the State of California; "redwood-city" is the organization name; and "rcsd" is the sub-domain. In some nations, such as the United Kingdom, the order of these elements is reversed.

One popular technology enjoying wide use with the Internet is known as the World Wide Web. The World Wide Web enables a computer to locate a remote server using the DNS and then establish a connection to the server and retrieve information using a communication protocol called the Hypertext Transfer Protocol (HTTP). Each item of information available using the Web, including files, images, or pages, is called a resource. A Uniform Resource Locator (URL) uniquely identifies each resource stored on a server. A URL is a form of network address comprising a domain name coupled to an identifier of the location of information stored in a network.

An example of a URL is http://www.centraal.com/index.html. In this example, "http://" indicates that the information associated with the URL can be accessed using HTTP; www.centraal.com identifies the server that is storing the information; and "index.html" identifies a file or page on that server.

The local computer requests information by providing a request containing a URL of the desired information to the remote server. The server receives the request, locates the page of information corresponding to the URL, and returns the page to the local computer over the HTTP connection. The pages of information are files prepared in the Hypertext Markup Language (HTML). The local computer runs a browser program that can read HTML files, interpret HTML codes in the files, and generate a complex graphical display.

Because the Web offers so much information about so many subjects, often the Web is compared to a library. In this analogy, the books in the library are network resources such as Web pages. All of the books are written in the same language, namely HTML. Unfortunately, although HTML is a simple language, it does not provide a mechanism that can be used to express attributes relating to a network resource. Thus, continuing the library analogy, a Web page is like a book that has no cover. The content of the Web page can be read, but there is no descriptive information about the Web page, such as its title, subject, or publication date, associated with the Web page. It is difficult to identify or refer to a book that has no title. Since Web pages do not inherently contain a cover that stores a title, conventionally, Web pages are referenced by a location identifier or URL in the DNS system. The current DNS system as implemented with the Web has several disadvantages and drawbacks. Although the DNS system ensures that each URL is unique across the Web, URLs are difficult to remember and associate with a particular institution, person, or product related to the owner of the domain or page associated with the URL. For example, to locate a page of information about the Walt Disney film "Bambi", in the current system a user must enter a complex URL into the browser, such as http://www.disney.com/DisneyVideos/masterpiece/shelves/bambi.

Thus, an inherent disadvantage of the DNS system is that the user must know the exact location and name of the desired information. In the library analogy, URLs are like card catalog numbers. Few persons go to a library knowing the exact card catalog number of a desired book. However, in the Web environment, there is no alternative, even though users tend to naturally remember the names of network resources but not their locations. Moreover, network resources are volatile; their locations may change or be reorganized over time at the discretion of the operator of the server that stores the network resource. Thus, a URL that is accurate one day might be inaccurate the next day, so that the network resource cannot be located.

Further, the network address must be typed correctly every time or the resource will not be found. The format of URLs is complex and unpredictable. Errors are hard to spot. Addresses are difficult to guess.

A further disadvantage of the DNS system is that according to current standard protocols, network addresses or URLs can be expressed in only 60 alphabetic and symbolic characters. The alphabetic characters can be expressed only in the Roman alphabet using the letters A through Z and the digits "0" through "9". This limited character set imposes a severe limitation on the use of DNS in international communications. For example, it is not currently possible to express a network address or URL in the Cyrillic characters used in the Russian language or in the Kanji characters used in the Japanese language.

Because of the difficulty of associating a location identifier with a desired network resource, specialized Web sites known as " search engines" have been developed to provide a way to enter natural language words or phrases and retrieve a list of other Web sites that contain the words or phrases. Examples of search engines are AltaVista, Yahoo!, and Lycos. However, search engine technology has limitations and drawbacks. For example, search engines do not understand the content of the Web pages indexed by the search engine; search engines merely remember the Web pages.

Further, search engines merely return a list of Web pages that contain the words or phrases entered by the user; they do not automatically navigate to a pertinent page. The list returned by the search engine may have thousands of entries, many of which are irrelevant to what the user wants. In the library analogy, this process is like requesting a librarian to search for a book, and receiving from the librarian a list of card catalog numbers at which the book might be located.

In addition, the list almost always contains entries that merely mention the words or phrases entered by the user but are not associated with the owner of a product or service identified by those words or phrases. For example, a user might want to locate the Web site owned and operated by United Airlines. The user enters "United Airlines" into the query field of a search engine. The search engine returns a list of Web sites or Web pages that contain the words "United Airlines." However, many of the entries in the list are not owned or operated by United Airlines; they are owned or operated by third parties that merely mention the words in their pages. Further, the lists produced by search engines often are unordered, so that the user must carefully search the list to identify a desired entry. While search engine technology may have been adequate when the Web contained only a few documents, the Web is currently estimated to contain more than 200 million pages, rendering impractical the continued use of search engines based on location identifiers. Some have proposed making search engines smarter, using new ranking algorithms, semantic analysis, and HTML filtering techniques. Nevertheless, search engine performance continues to degrade because the Web is growing faster than search engine technology is improving.

Search engines also suffer from the disadvantage that they can be fooled by metatags. The HTML language defines a metatag facility whereby text such as key words or descriptions is written into a Web page's HTML code as a means for a search engine to categorize the content of the Web page. The browser does not display the metatags when the Web page is received and decoded at the client. The metatag facility can be used to fool a search engine by encoding a non-displayed keyword into a Web page that has nothing to do with the actual content of the page. When the keyword is used for a Web search, the Web page is located and displayed even though the displayed content of the page is unrelated to the key word.

Based upon the foregoing, it is clearly desirable to provide a way to associate abstract properties of a network resource with the network resource.

It is also desirable to have a way to access information available over the Web using a natural language word or "real" name associated with the information.

It is also desirable to have a Web browser program that can rapidly locate, load, and display information in response to receiving a natural language word or "real" name associated with the information, thereby providing a way to instantly retrieve information stored in a network based upon the real name rather than the address of the information.

It is also desirable to have such a system that can automatically and immediately navigate or direct the user to a particular network resource, without providing or requiring the user to search through a list of results or matches. It is also desirable to have a flexible, simple way to associate a natural language word or "real" name with a set of information.

It is also desirable to have such a system that can associate a natural language word or name with a subordinate page of a Web site rather than with only the "home" or root page.

It is also desirable to have such a system that can associate a natural language word or name only with an organization that owns, operates, or produces a product, service, or other thing that is identified by the word or name.

It is also desirable to have a way to associate information stored in a network with human-readable resource names, so that end users can navigate the network using simple words and sentences expressed in any human written language.

It is also desirable to have a way to associate multiple names, each expressed in a different human-readable language, with the same network resource, so that a particular network resource can be retrieved in a language-independent manner.

It is also desirable to have such a system configured in a way that provides distributed storage of the real name information.

There is a further need for a mechanism to navigate to a network resource based upon its name and without misdirection caused by a metatag in the network resource.

SUMMARY OF THE INVENTION

The foregoing needs, and other needs and objects, are fulfilled by the present invention, which comprises, in one aspect, a method of navigating, based upon a natural language name, to a resource that is stored in a network and identified by a location identifier, comprising the steps of storing a first natural language name of the resource in association with the location identifier of the resource; receiving a request to locate the resource containing the first natural language name; retrieving the location identifier associated with the first natural language name; and delivering the resource to the user using the location identifier.

One feature of this aspect involves storing at least a second natural language name for the resource, expressed in a language other than that of the first natural language name, in association with the location identifier; receiving requests to locate the resource based on the first and second natural language names; retrieving the location identifier associated with the first and second natural language names; and retrieving and displaying the resource using the location identifier. Another feature involves the steps of storing the first and second natural language names in association with the location identifier, and in a name file in a storage device associated with the resource.

Yet another feature involves the steps of retrieving the name file; parsing the name file; building an index entry based on the values parsed from the name file; and storing the index entry in an index that is stored apart from the storage device. Still another feature is the steps of sending the name file over the network to a client associated with the resource; and storing the name file in a server storage device of a server associated with the client. Another feature involves periodically polling the name file on the server associated with the client; testing whether one of the natural language names stored in the name file matches a third natural language name stored in a database indexed by the index; and updating the database when changes are detected in the name file. Yet another feature is the step of synchronizing the index to the database.

According to another feature, the method includes the steps of receiving a client identifier of a client associated with the resource; generating a set of metadata that describes the resource, the location identifier, and the client identifier; and storing the set of metadata in a persistent storage device associated with the client. Another feature is assigning a randomly generated name to the set of metadata. Yet another feature is instructing the client to store the metadata in a particular authorized location in the persistent storage device. Another feature is registering the set of metadata and the randomly generated name in a database.

The foregoing is merely a brief summary of one aspect of the invention. The invention encompasses many other aspects, as set forth in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A mechanism for naming and locating network resources in a language-independent way is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Name File Format

In the preferred embodiment, metadata is associated with network resources such as Web pages. Generally, metadata is data that describes other data. The metadata defined herein provides information that describes a Web page in a manner analogous to the manner by which a catalog card describes a book in a library. For example, the metadata includes information that provides a title (also called a real name address), a description, a language designation, or a geographical location. The metadata is defined by an administrator of the server that stores the Web pages that are described in the metadata, and a copy of the metadata is stored in association with that server so that the metadata is accessible using the Web. Using a Librarian, the a copy of the metadata is registered with a database that is coupled to an index.

Preferably, the metadata is prepared and initially stored in the form of a Name File 64 is a text file defined by the Extensible Markup Language (XML) grammar. XML is a language definition promoted by Microsoft Corporation and Netscape Communications Corporation. Further information about XML is provided in "XML: Principles, Tools, and Techniques," The World Wide Web Journal, vol. 2, no. 4 (Fall 1997) (Sebastopol, Calif.: O'Reilly & Assoc., Inc.).

Preferably, the text in the Name File 64 is compatible with the Resource Definition Format ("RDF") format. RDF is a syntax of XML designed by the World Wide Web Consortium for expressing semantics. The text file is also called an RNS file. An example of an RNS file is set forth in FIG. 1A.

The RNS file 900 is defined according to a grammar in which information elements are surrounded by complementary tags. For example, "<resource>" and "</resource>" are complementary tags. The RNS file 900 has two general parts, namely a schema section 902, and a data section 904. The schema section 902 and the data section 904 are enclosed within complementary tags ("<xml>, </xml>") that indicate that the RNS file 900 is in the XML grammar.

Figure 1A:
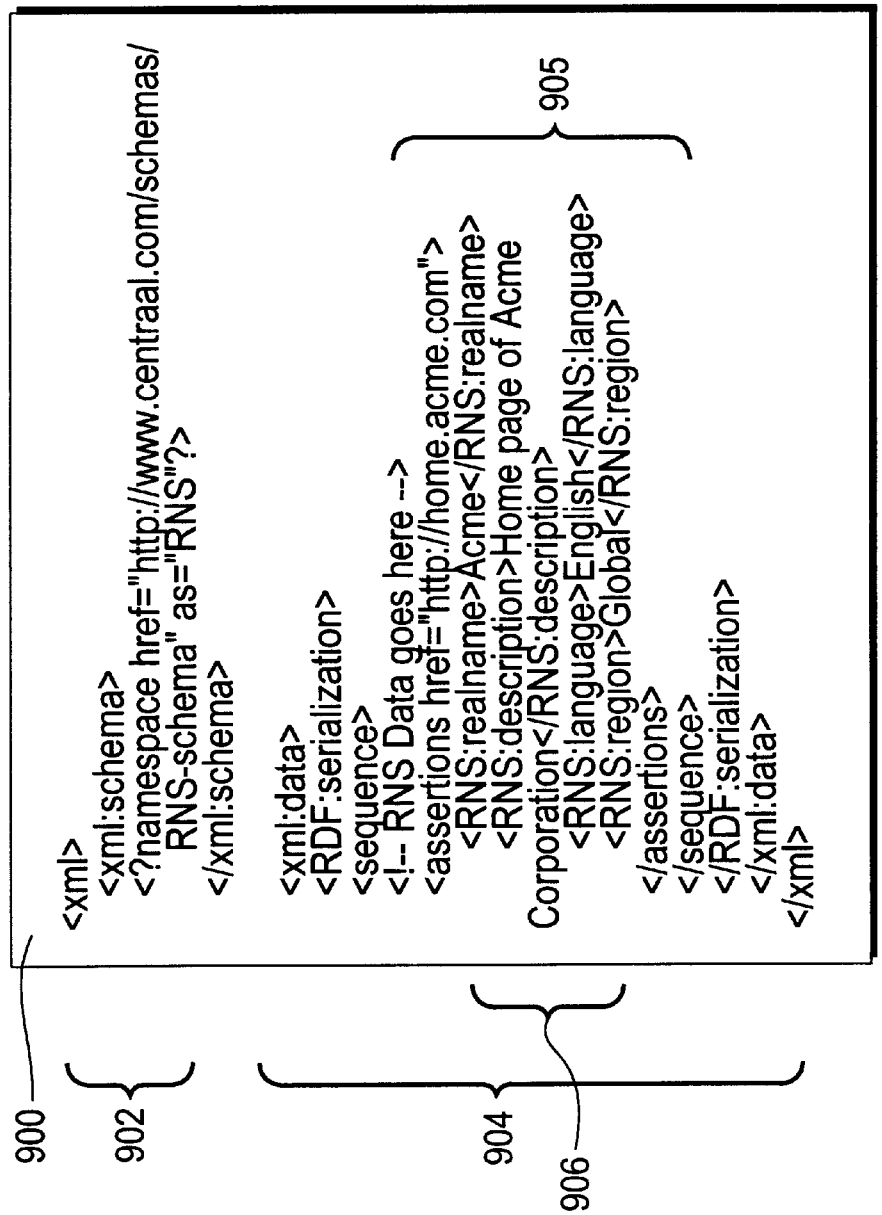
FIG. 1A is a diagram of a name file.

The schema section 902 is delineated by the <schema> and </schema> tags. The schema section identifies the schema that is used to organize data in the data section. In the example of FIG. 1A, an "href" anchor code in the schema section refers to a file, "RNS-schema", located on a Web server, that contains the schema definition. The schema is assigned the name "RNS." Tags in the RNS file 900 that are part of the RNS schema have a prefix of" RNS:". Based on this prefix, the XML parser that reads the RNS file 900 can identify tags that are part of the RNS schema.

The data section 904 is delineated by the <xml:data> and </xml:data> tags. The data section contains one or more RNS entries 905. Each RNS entry 905 is delineated by the tags <assertions> and </assertions>. Conceptually, each RNS entry 905 is a set of assertions about a network resource that is identified within the <assertions> tag. In the example of FIG. 1A, one RNS entry 905 makes assertions about the network resource home.acme.com, which for exemplary purposes is the home page of a fictional company, Acme Corporation.

The RDF language provides a general mechanism for describing many types of resources. RDF does not inherently provide facilities for describing Web pages. Accordingly, a Name File 64 is expressed in an RDF vocabulary that is specific to Web pages that expresses the main attributes of a Web page. The attributes include, for example, a real name address, a location identifier or URL, a description, a language attribute, a region attribute, and a listings attribute.

Each RNS entry 905 has a set of metadata 906. In the example of FIG. 1A, the metadata 906 contains a value that identifies the real name of the resource. The real name value, "Acme," is between the <realname> and <realname> tags. The metadata 906 also includes a description value, a language identifier value, and a region identifier value. A pair of tags delineates each value. For example, in FIG. 1A, the description value is "Home Page of Acme Corporation," the language value is "English," and the region value is "Global." The description value provides a description of the network resource that is associated with the real name.

When multiple resources are defined in one RNS file, for security reasons, each network address declared for a resource must be related to the shortest network address that is declared in the RNS file for any resource. In the preferred embodiment, each network address must be logically subordinate to or descended from the network address in the RNS file that is shortest in characters. For example, in the excerpt provided in FIG. 1A, all subsequent resource declarations would be required to identify network addresses that specify files located within the directory tree for which www.centraal.com is the root node. This relationship is checked by the Registration Service 22 when the RNS file is initially created.

A key advantage of this mechanism is that it can be used to provide multilingual access to network resources. One or more Name Files 64 are established. The Name Files 64 store a plurality of entries. Each of the entries stores the name of a network resource, in a different language, in association with the <realname> field. However, each of the entries references the same network resource in association with the <resource> tag.

For example, one or more Name Files 64 have entries that store real names in English, French, German, and Japanese. Each entry identifies the same network resource. Accordingly, the entries establish real names in a plurality of different languages, all of which point to or resolve to the same network address. When a third party wishes to access the referenced network resource, the third party enters the real name of the network resource into the browser 74 or the GO service 42 in whatever language is most convenient for the third party. The Resolver 40 will resolve the real name, regardless of language, to the same network address and direct the browser to that address. Accordingly, a user can locate and access network resources in a language-independent manner.

In an alternative embodiment, the attributes also include a listings attribute set off by the tag <RNS:listings>. A listings attribute is one or more keywords or other values that describe other properties of a resource. For example, each resource has a subject property that identifies the general nature of the product, service, or organization that is associated with the resource. This enables the database to be organized like a " yellow pages" directory. As an example, Acme Corporation includes in its Name File 64 the line <RNS:listings>Anvils, Rockets, Slingshots to indicate that it is a manufacturer of anvils, rockets, and slingshots.

As another example, United Airlines constructs its Name File 64 so as to store the subject property "airlines" in association with a resource definition. United Van Lines, a moving and storage company, stores the subject property "moving". When displaying a set of list entries, the system displays the subject property value in association with each resource. When the user is providing a real name to one of the services 42–46, the user includes a value for the subject property in the query. The system searches for resources in the index that match both the real name and the subject property value.

In an alternative embodiment, the resources described in the Name File 64 are persons rather than Web pages. A resource of type "person" has metadata including a mailing address, email address, and other personal information. In this embodiment, the system can be used as a person locator service rather than for navigating to Web pages or other network resources.

In other alternative embodiments, the Name File 64 stores other attributes. For example, other attributes include Organization, Subject, Abstract, Type, Audience, and other attributes. In the Organization attribute the Name File 64 information that identifies an organization or company that owns or is associated with the network resource, for example, "Federated Stores Incorporated." In the Subject attribute the Name File 64 stores information that describes the subject matter of the network resource, for example, "dogs." In the Abstract attribute the Name File 64 stores information containing an abstract of the network resource. In the Type attribute the Name File 64 stores information describing a type of the network resource, for example, " RealAudio file". In the Audience attribute the Name File 64 stores information describing the intended audience of the network resource, for example, "Women age 19–34".

Defining metadata for a network resource, associating the metadata with a network resource, and storing a copy of the metadata on a server that contains the network resource in this manner offers significant advantages. For example, maintenance of the metadata is convenient. Since a copy of the metadata is stored locally on the server that contains the network resource, the metadata can be updated at any time without contacting a central service. As described further herein, a metadata crawler mechanism periodically visits the server to monitor changes in the metadata. If a Name File 64 has changed, after validation, the changes are automatically propagated to the database and the index.

In addition, in combination, the Name Files 64 operate as a distributed database of metadata. Maintaining a distributed database enhances scalability, because modifying the metadata is not dependent upon the availability of a single centralized database. Further, by storing the metadata files in association with the server on which the network resources are stored, data integrity is improved. Only a user having authorization to store files on a server can create metadata mappings that reference network resources on that server.

Yet another advantage is multi-lingual compatibility. The XML language supports the UNICODE character encoding standard. As a result, attributes stored in a Name File 64 can be expressed in any human language.

Real Name System

Figure 1B:
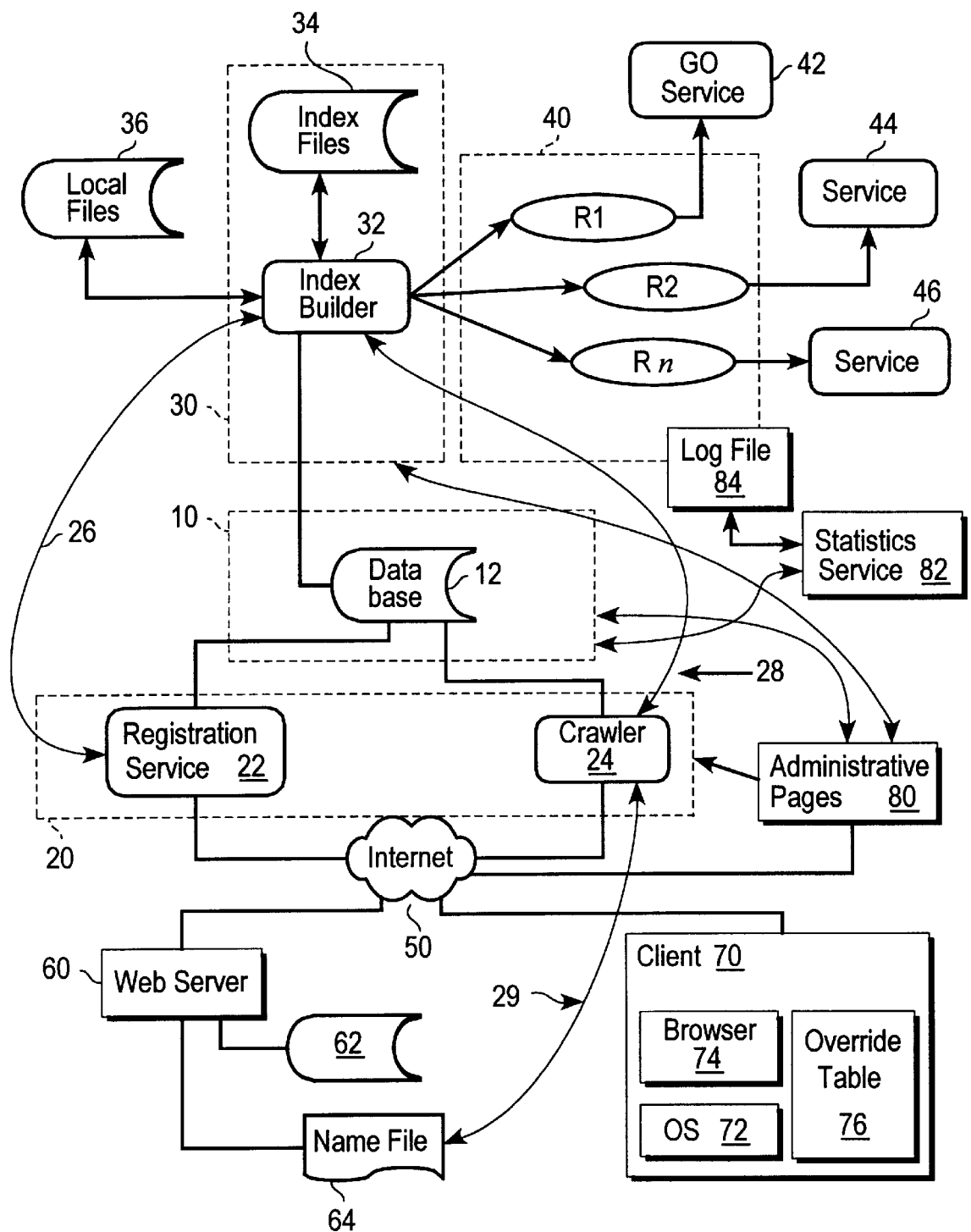
FIG. 1B is a block diagram of one embodiment of a system for navigating network resources based on metadata.

Using the metadata stored in Name Files 64, in combination with a network resource locating system, attributes of a network resource can be used to locate the network resource. For example, the real name attribute of a Name File 64 can be used to locate a Web page. FIG. 1B is a block diagram of an embodiment of a network resource locating system comprising a Registry 10, a Librarian 20, an Index 30, and a Resolver 40.

The Registry 10 includes a database 12 in the form of a commercial database system, such as the SQL Server, or a proprietary database. The Registry 10 provides a centralized storage point for mappings of real names to network addresses or URLs, as well as descriptive information associated with the real names. In this context, "real name" refers to a name of a network resource expressed in conventional syntax of a natural language, such as English, Japanese, Russian, etc. Each real name is required to be unique across the Internet and unique within the Registry 10. The uniqueness of real names is enforced by the Registry 10. The Registry 10 operates as a centralized, highly robust, and scalable persistent storage area for all metadata. The Registry 10 also stores statistics related to the usage of the metadata in the context of various services that are built on top of the Registry, such as the GO navigation system described herein.

Real names, network addresses, and the descriptive information are loaded into the Registry 10 by the Librarian 20. In the preferred embodiment, the Librarian 20 and the Index 30 communicate with the database 12 using an ODBC interface. In the preferred embodiment, the database 12 has a capacity on the order of several hundred million entries. The Registry 10 and database 12 help ensure a consistent structure and vocabulary across Web sites.

The Librarian 20 has a Registration Service 22 and a Crawler 24, each of which is coupled to the database 12 and to a network such as the Internet 50. The Registration Service 22 receives new mappings of real names to network addresses, and descriptive information, and loads them into or "registers" them with the Registry 10. The Registration Service 22 receives the mappings from a client 70 over the Internet 50. The Crawler 24 traverses or crawls the Internet 50, periodically connecting to registered Web servers that are connected to the Internet, to locate changes to the mappings stored in or in association with the Web servers.

The real naming system interacts with one or more web servers that are connected to the Internet 50. As an example, one Web Server 60 is shown in FIG. 1B, but any number of Web servers can be used in connection with this embodiment. A local database 62 is coupled to the Web Server 60 so that the Web Server can retrieve values from the local database for use in web applications running on the Web Server.

A Name File 64 is also stored in association with the Web Server 60 such that the Web Server can retrieve the Name File and forward its contents to the Internet 50 in response to a request. In the preferred embodiment, the Name File 64 stores one or more real name entries. Each real name entry contains a real name of a resource in the Web Server 60, a description of the resource, a network address, or other identifier of the location of the resource, and other information about the resource such as its language and intended geographic region of use. Preferably, the Name File 64 also stores an identifier of a grammar that is used to format the other information in the Name File. In this way, the information in the Name File is self-describing and language-independent.

In this context, the term "network address" refers to an unambiguous identifier of the location of a network resource. An example of a network address is a URL.

As indicated by path 29, the Crawler 24 can contact the Web Server 60 and retrieve values stored in the Name File 64 using a connection through the Internet 50. As indicated by path 28, the Crawler 24 can notify the Index 30 that the Index Files 34 need to be updated to reflect a change in the information stored in the Name File 64.

The Index 30 is coupled to the Registry 10. The Index 30 comprises an Index Builder 32 and one or more Index Files 34 that contain an index of all real names, real name entries, and resources known to the system. For example, the Index Files 34 have index entries for values stored in the Name File 64. The Index Files 34 are constructed, managed, and updated by the Index Builder 32.

Generally, in the preferred embodiment, the Index Files 34 are more compact than the indexes maintained by conventional search engines, because the amount of information represented in all the Name Files 64 is far less than the total content of all network resources available on the Web. Such compactness is a distinct advantage, providing greater scalability and responsiveness than conventional search engines. In addition, the compact size of the Index Files 34 allows the Index 30 to be replicated in multiple different geographic locations.

The Resolver 40 comprises one or more resolver processes R1, R2, Rn, each of which is coupled respectively to a Service 42, 44, 46. Each resolver process R1, R2, Rn communicates with its respective Service 42, 44, 46 to receive requests containing a real name, convert or resolve the real name into a network address associated with the real name, and forward the network address and other information associated with the real name to the requesting Service.

A client 70 is coupled to the Internet 50. The client is a computer, server, or network in which a Web browser 74 runs under control of an operating system 72. An example of the Web browser 74 is Netscape Communicator®, and an example of the operating system 72 is Microsoft Windows 95®. The services of the real naming system are accessible to the client 70 over the Internet 50 using the browser 74 according to standard Internet and Web protocols.

For example, under control of the browser 74 and the operating system 72, the client 70 can establish an HTTP connection through the Internet 50 to the Registration Service 22. The browser 74 retrieves pages or forms from the Registration Service 22 that are prepared in the HTML language. The browser 74 displays the pages or forms. A user of the client 70 reads the pages, or enters information in a form and sends the filled-in form back to the Registration Service 22. In this way, the client 70 and the Registration Service 22 carry out a dialog by which a user of the client 70 can perform functions offered by the system.

Preferably, the Registration Service 22, Crawler 24, Index Builder 32, and Resolver 40 are one or more computer programs having the functions and procedures described herein. In one embodiment, each of the Registration Service 22, Crawler 24, Index Builder 32, and Resolver 40 is an independent process, and one or more instance of each such process can be active and executing at a given time. In the preferred embodiment, the computer programs are constructed using an object-oriented programming language and related tools, such as the Java® language.

The Registration Service 22, Crawler 24, Index Builder 32, and Resolver 40 preferably execute on one or more server computers that can rapidly access, manage, and update the database 12 and index files 34. The foregoing elements can be distributed or segregated. For example, it is contemplated that the Resolver 40 and its processes R1, R2, Rn execute on one server computer, and the Registration Service 22, Crawler 24, and Index Builder 32 operate on the same computer or on a set of computers separate from the server that hosts the Resolver 40. In this configuration, the Resolver 40 can rapidly receive and respond to client requests for access to network resources that are indexed in the Index Files 34, without affecting or interfering with the other elements and their functions.

In one embodiment, the Librarian 20, and other functions of the system, are accessed by connecting the client 70 to one or more administrative Web pages 80 that implement the functions, using an HTTP connection. The administrative Web pages 80 are hosted on a Web server and are generated by a Web server application that can communicate with the other elements of the system. The Web server application sends a top-level page to the client 70. The browser 74 of the client displays the top-level page, which presents a menu of options for working with the system. For example, preferred menu options are set forth in Table 1.

TABLE 1

TOP LEVEL MENU OPTIONS

RNS FILE
    Create
    Activate
    Modify
    Delete
STATS & BILLING
    Stats
    Billing
CUSTOMER
    New Customer
    Modify Profile
    Change Contacts
    Logout Each of the top level menu options can be selected by moving the cursor generated by the client 70 over the name of the desired option, using the client's pointing device, and clicking on the desired option. The functions carried out by selecting each menu option are described below in the context of the functional module that carries out the functions.

In the preceding discussion, the elements of the system have been described with respect to the Internet 50 as an interconnecting element. However, the Internet is merely one example of an interconnecting element that can be used to facilitate communication among the elements of the system. Other elements, such as local-area networks, wide-area networks, Intranets, and extranets can be used. Also, the protocols that define the Internet, such as Transmission Control Protocol and Internet Protocol, are not required; other protocols are suitable and can be used.

In this configuration, the system has numerous advantages over prior approaches. For example, customer Web sites 60 are isolated from the database 12. The Index Files 34 are separate from the database 12 and only the Index Files are accessed by the Resolver 40. This reduces database loading and increases responsiveness, and provides scalability. The architecture is well suited to distributed replication of the Index Files.

Customer Profile Functions

In one embodiment, the system provides a set of customer information management functions that store, track, and update information about customers of the system. The information managed for each customer is called a customer profile. The customer profiles are stored in the database 12.

When the Customer/New Customer option is selected, the system generates one or more Web pages containing forms that enable a user to enter a new customer profile. The form has fields for entry of a name, address, telephone number, contact person, and payment method. The Web pages and forms are communicated to the client 70 and displayed by the browser. The user of the client 70 enters appropriate information into the data entry fields and clicks on or selects a "SUBMIT" button on the Web page. In response, the client 70 returns the filled-in form in an HTTP transaction to the system. The system extracts the entered information from the fields and stores the information in a table of the database 12.

In the preferred embodiment, the Customer/New Customer registration process is initiated using a Web page generated by the system in the form shown in Table 2:

TABLE 2—REGISTRATION HOME PAGE

Welcome to the Real Name System registration site. Before you can submit your Real Name addresses, you need to provide us with some information about you and the organization that you may represent.

To initiate the registration process, you first need to enter your email address as your login name, and select a password.

You will need to remember this login name and password, as the Real Name System uses them to grant you access privileges.

Name
Password
                     [BACK] [NEXT]

In Table 2, the designations [BACK] and [NEXT] represent function buttons. The user enters the user's email address in the Name field, and a user-selected password in the Password field. When the user clicks on the NEXT function button, the Name and Password are stored in the database 12 in association with one another.

Preferably, the system then displays a Web page containing a form that enables the system to receive further information about the user. The form has fields for entering the user's name, address, city, state, postal code, nation, and telephone number. The user enters the requested information and clicks on a NEXT button. The system checks each value to verify that it matches the proper data format required for the corresponding field. The values are stored in the database 12 in association with the user's name and email address. Collectively, this information is the customer profile. Once the customer profile is established, the user can create real name entries and store them in one or more Name Files 64.

Selecting the Customer/Modify Profile option causes the system to generate a Web page containing a form that enables a user to change a previously entered customer profile. To ensure secure operation, the user's IP address is extracted from the HTTP transaction that the user used to request the Customer/Modify Profile option. The user is permitted to view and modify only that profile that corresponds to a previously created Name File that is stored on a server having the same IP address as the user. Based upon the user's IP address, the system looks up the corresponding profile in the database 12 and retrieves the contents of the profile. The contents of the profile are displayed in the Web page.

The user may then move the cursor generated by the client 70 to any of the data values displayed in the Web page and enter modifications to the values. When the user selects or clicks on the "SUBMIT" button, the Web page containing the filled-in values are returned to the system in an HTTP transaction. The system updates the database 12 using the values in the page.

Selecting the Customer/Change Contacts option enables the user to change the billing contact associated with a registered Name File. Selecting the Customer/Logout option enables the user to terminate the current session, or log in as a different customer. These functions are provided using a Web application that receives and loads appropriate values into the Registry.

Registration Service

Figure 2A:
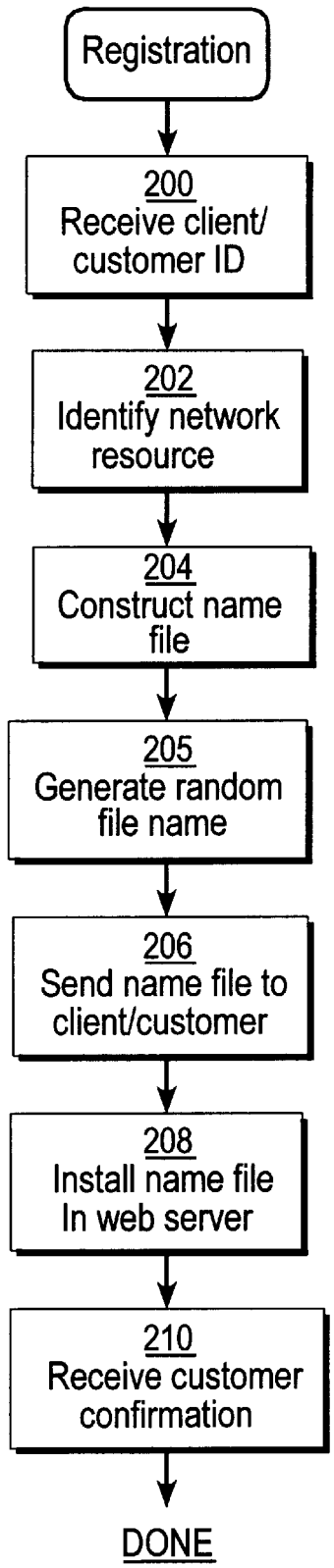
FIG. 2A is a flow diagram of a method of a registration service in the system of FIG. 1B.

FIG. 2A is a flow diagram of an embodiment of a preferred method of operating the Registration Service 22 of the Librarian 20.

Preferably, the Registration Service 22 has a Web page interface by which one or more clients 70 can access functions offered by the Registration Service by selecting function buttons of the Web pages to activate the functions.

The primary function offered by the Registration Service 22 is registration of new real names into the Registry 10. In one embodiment, the Registration Service 22 is invoked by selecting the Create option from the top-level menu page. As shown in block 200, an external user or "customer" of the system identifies himself or herself to the system so that information entered later can be associated with the customer. This information includes an electronic mail address of the customer whereby messages can be directed from the Registration Service 22 to the customer over the Internet 50. In this context, the terms "customer" and "user" refer to the operator of a computer remotely connected to the system, for example, the client 70.

As indicated in block 202, the customer then provides information to the Registration Service 22 that identifies a network resource of the Web Server 60, by its location, its real name, and descriptive information about the network resource. For example, the customer enters the real name "Microsoft Internet Explorer," the URL http://www.microsoft.com/ie4/ aboutie4.html, and a description about the resource. Preferably, this information is entered in fields of a Web page that is constructed for the purpose of receiving the information, in the form shown in Table 3:

TABLE 3

REAL NAME ENTRY PAGE

| | |
|---|---|
| Real Name: | Microsoft Internet Explorer |
| URL: | http://www.microsoft.com/ie4/aboutie4.html |
| Type: | Company |
| Language: | English |
| Region: | North America |
| Description: | This is the home page for Internet Explorer. |
| | [BACK] [NEXT] |

When the user has entered all the information, to continue processing of the Name File 64, the user clicks on the NEXT function button at the bottom of the page. In response, as shown in block 204, the Registration Service 22 constructs a Name File 64 based on the information entered by the customer. At this point, the Name File 64 is stored on a server accessible to the Registration Service 22. However, the Name File 64 is not yet stored in association with the Web server 60.

In block 205, the Registration Service 22 generates a file name at random for the Name File 64. A random file name is used in order to prevent unauthorized programs, processes, or users from identifying or modifying the Name File 64 when it is stored in association with the Web Server 60. If the same file name was used, at any Web server registered with the Registry 10, an unauthorized user could modify an entry stored in the Name File 64 to reference a different network resource. Eventually, as will be discussed further below, the Crawler 24 would detect the modification and store the new name in the Registry 10. Accordingly, it is desirable to hide the name of the Name File 64 from all unauthorized users.

In block 206, the Name File 64 is sent as a file attachment to an electronic mail ("email") message to the customer. Block 206 includes the step of receiving an email address from the user. In the preferred embodiment, the system displays a Web page having a data entry field for the email address, in the form shown in Table 4:

TABLE 4—EMAIL ENTRY PAGE

Please enter your email address so that we can send you the name file that you have just built.

| | |
|---|---|
| nico@centraal.com | [BACK] [NEXT] |

After sending the Name File 64 in an email to the user, the system displays a confirmation page at the client 70. In the preferred embodiment, the confirmation page has the form shown in Table 5.

TABLE 5

CONFIRMATION PAGE

Your Name File has been mailed to the address nico@centraal.com. You should now save this file on your Web site according to the instructions in the email that you will receive.
Once this step is accomplished, the file will have to be activated through the Real Name file activation service. (Simply follow the previous link, or in Customer Service, look for the menu item Activate under the RNS File category.)

[FINISH]

In block 208, the customer installs the Name File 64 in the Web Server 60 or in a manner that is accessible to the Web Server. Preferably, the Name File 64 is stored in a location on the Web Server 60 that is specified by the Registration Service 22. For example, the email specifies that the Name File 64 shall be stored in the root directory of the network resource that is named in the Name File 64. This is done to ensure that the receiving customer individual is authentic; the Registration Service 22 presumes that only an authentic customer representative would have root directory access to the Web server on which the named network resource is located. The root directory is also specified for the convenience of the customer. When the Name File 64 is stored in the root directory of the Web server, the customer can modify or re-organize the Web server without affecting the Name File. Conversely, if the Name File 64 was stored in a subordinate directory of the Web server, then there would be a risk of disabling the Name File by accidentally deleting its directory.

In block 210, the customer confirms to the Registration Service 22 that the Name File 64 has been stored in the specified location by the customer. The customer confirmation can be provided in an email directed to the Registration Service 22 or by entering an appropriate command using the Web interface of the Registration Service 22.

Figure 2B:
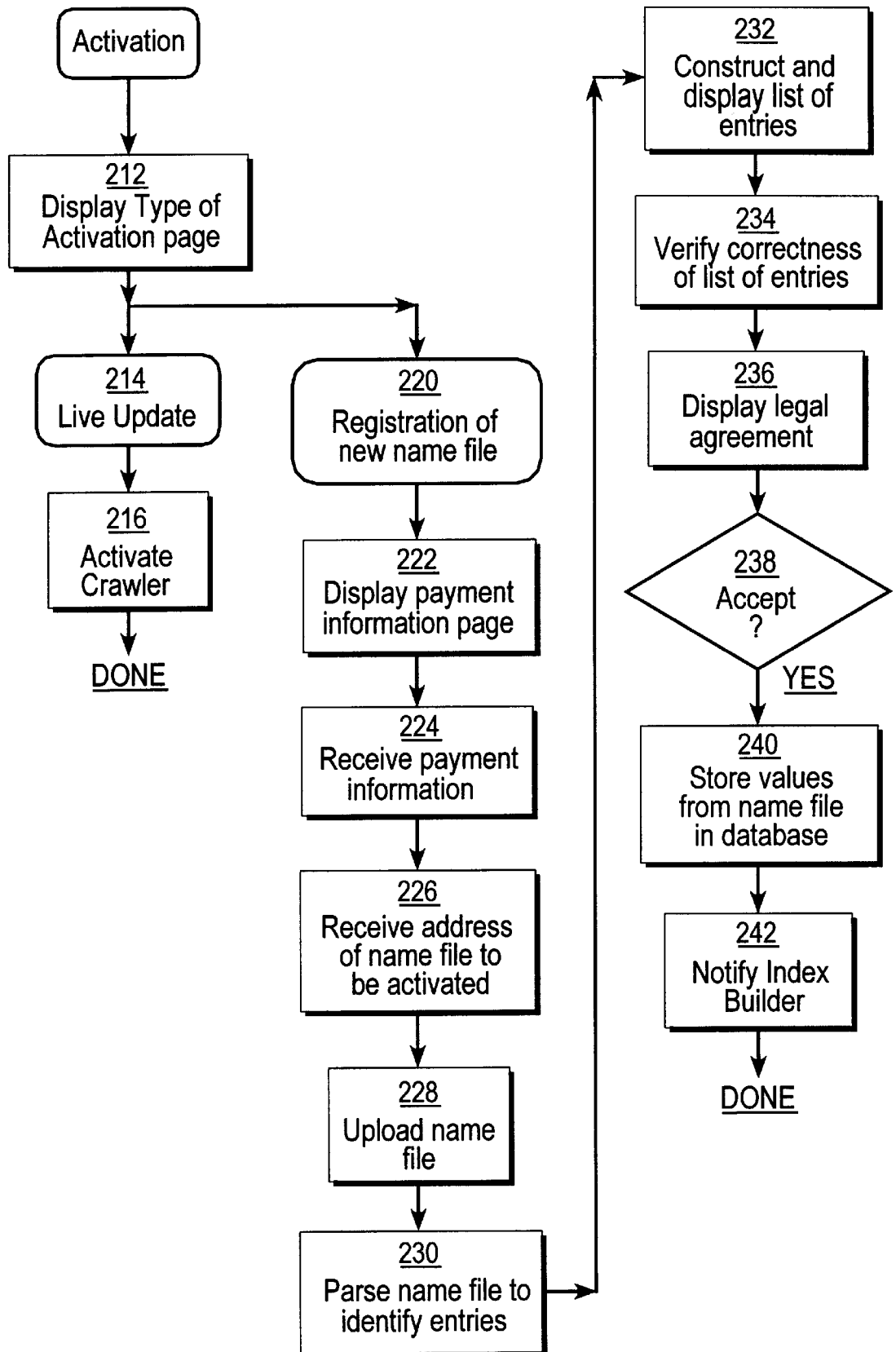
FIG. 2B is a flow diagram of a method of activating a name file in the system of FIG. 1B.

Thereafter the user is required to activate the Name File. Activation is a process of verifying that the Name File is stored in the correct location by an authorized user. Optionally, the activation process also includes the process of arranging payment for the privilege of having a registered Name File recognized by the system. One embodiment of an activation method is shown in FIG. 2B.

In the preferred embodiment, the user activates a Name File after creating it by selecting the RNS File/Activate function from the top-level menu option list. In response, as shown in block 212, the system constructs a page that requests the user to enter a type of activation, and sends the page to the client, which displays it. For example, the system displays a page of the form shown in Table 6:

TABLE 6

ACTIVATION TYPE SELECTION PAGE

Please select the appropriate service:
(*) Live update of a previously registered Name File.
(*) Registration of a new Name File on your website.
[BACK] [NEXT]

Preferably the symbols shown in the form "(*)" in Table 6 above are displayed as radio buttons, or another graphic element, that can be selected by the user.

When the user selects the first option ("Live update of a previously registered Name File"), as shown in blocks 214–216, the system activates the Crawler, which locates the user's Name File over the Internet, and updates the database 12, as described below. Thus, the "Live update" function provides a way for a user to force the system to locate a modified Name File and update itself with the new information. Alternatively, as described below in connection with the Crawler, the user may simply wait and the Crawler eventually will locate the modified file and update the database.

When the user selects the second option ("Registration of a new Name File on your website"), as shown in blocks 220 to 222, in response the system constructs and sends to the client 70 a Web page with which the user can enter payment information pertaining to the user and its Name Files. Payment steps of the activation process are an entirely optional part of the process, and other embodiments are contemplated that omit any payment mechanism. In the embodiments that do use a payment mechanism, the Web page contains fields that accept entry of payment information. For example, the fields enable entry of a credit card type, card number, expiration date, and cardholder name. The system receives the payment information values in block 224.

In block 226, the system prompts the user to enter the network address of the Name File to be activated, and a description of the Name File.

In block 228, the Registration Service 22 establishes an HTTP connection to the Web Server 60, requests and uploads a copy of the Name File 64. This step is carried out to verify that the Name File 64 is valid and is stored in the correct location. In block 230, the Name File 64 is parsed, and values identifying the network resource are extracted. In block 232, the system constructs a Web page that displays all the entries parsed from the current Name File 64, and sends the page to the client 70. Within the Web page, the system displays a prompting message, such as the following:

"The Name File that we have downloaded from your site contains the following entries. Please verify these entries are correct. Press NEXT to continue.

[BACK] [NEXT]"

As shown in block 234, the user reviews the entries, verifies that they are correct, and clicks on the NEXT function button. If any of the entries is not correct, the user clicks on the BACK function button, which provides access to the MODIFY function described herein.

In the preferred embodiment, the system then displays a Web page containing a written legal agreement governing payment of registration fees and resolution of disputes involving real names or domain names, as shown in blocks 236–238. The agreement concludes with function buttons labeled ACCEPT and DECLINE. To accept the terms of the agreement and proceed with registration, the user clicks on the ACCEPT button. To decline the terms of the agreement and discontinue the activation process, the user clicks on the DECLINE button. Use of the legal agreement is entirely optional and embodiments that do not use such an agreement are contemplated and are within the scope of the invention.

The system then stores values parsed from the Name File 64 in the database 12 of the Registry 10, as shown in block 240.

For security reasons, the network address or URL of the Name File 64 must match the root directory of the Web server 60. This prevents redirection of real names to unauthorized different network addresses. It also prevents the owner of the Web server 60 from redirecting to that Web server any real name that he or she does not own.

In block 242, the Registration Service 22 notifies the Index Builder 32 that a new entry has been made in the database 12. Path 26 of FIG. 1B represents the notification. The notification includes information sufficient to identify the new entry in the database 12, for example, a row identifier ("rowid") of a table in which the new entry is stored. In response, the Index Builder 32 carries out a live update of the Index Files 34, in the manner discussed further below.

Thus, the Name File 64 created by the user is activated and available for use by the Resolver 40.

In the preferred embodiment, the database 12 is available to receive queries from registered members of the system. As a result, a registered member can submit queries to the database 12 that request the database to display currently registered information about network resources or Web pages of other organizations. Accordingly, if another registered user succeeds in registering information that misrepresents the content of that user's network resources, the misrepresentation can be reported to the Registry for corrective action. Thus, in this manner, the formality of the registration process, and the open query capability of the database 12 enable the present system to avoid the deception that is possible through the improper use of metatags.

Modifying and Deleting Name File Information

After a Name File is created having one or more entries, the entries can be edited or deleted using the RNS File/Modify and RNS File/Delete functions shown in the top-level menu list.

When the user selects the RNS File/Modify function, the system reads the RNS file from the server associated with the user, and displays the contents of the file in a Web page having the form shown in Table 7.

TABLE 7

RNS FILE/MODIFY PAGE DISPLAY

The current list of RNS entries contained in your RNS file is shown below. To edit an entry, select the appropriate word and press EDIT. To delete an entry, select the appropriate word and press DELETE. To add a new RNS entry, press ADD. Press NEXT when you are done editing the RNS file.
[BACK] [EDIT] [DELETE] [ADD] [NEXT]

| | |
|---|---|
| Real Name: | Nico Popp |
| URL: | http://nico.centraal.com |
| Type: | Company |
| Language: | English |
| Region: | Global |
| Description: | Nico's Page |
| Selection: | |
| Real Name: | Keith Teare |
| URL: | http://keith.centraal.com |
| Type: | Company |
| Language: | English |
| Region: | Global |
| Description: | Keith's Page |
| Selection: | |

The page consists of a text instruction section, a set of editing function buttons, and a list of entries currently contained in the Name File. The text instruction section explains the functions carried out by the editing function buttons. In the preferred embodiment, the function buttons of this page operate on entire Name File entries rather than individual fields within each entry. For example, to edit an entry, a user selects the appropriate real name, such as "Keith Teare" and presses the EDIT function button. In response, the system displays an entry editing page that contains the selected entry. The user can enter modified text in fields of the entry editing page.

Similarly, to delete an entry, the user selects the appropriate word and presses the DELETE function button. In response, the system constructs a new Name File that contains all the prior entries except the entry selected for deletion.

To add a new entry to the currently displayed Name File, the user clicks on the ADD function button. In response, the system displays a page in the form of Table 3 discussed above in connection with creating a new Name File.

To apply changes made in the EDIT, DELETE, or ADD operations, the user presses the NEXT function button. Selecting the NEXT function button causes the system to construct a new Name File, preferably in the above-described XML format. The system emails the new Name File to the user in an appropriate explanatory message. For security reasons, the user is required to store the new Name File in a directory specified by the system, as in the case of creation of a new file.

Crawler

Figure 3:
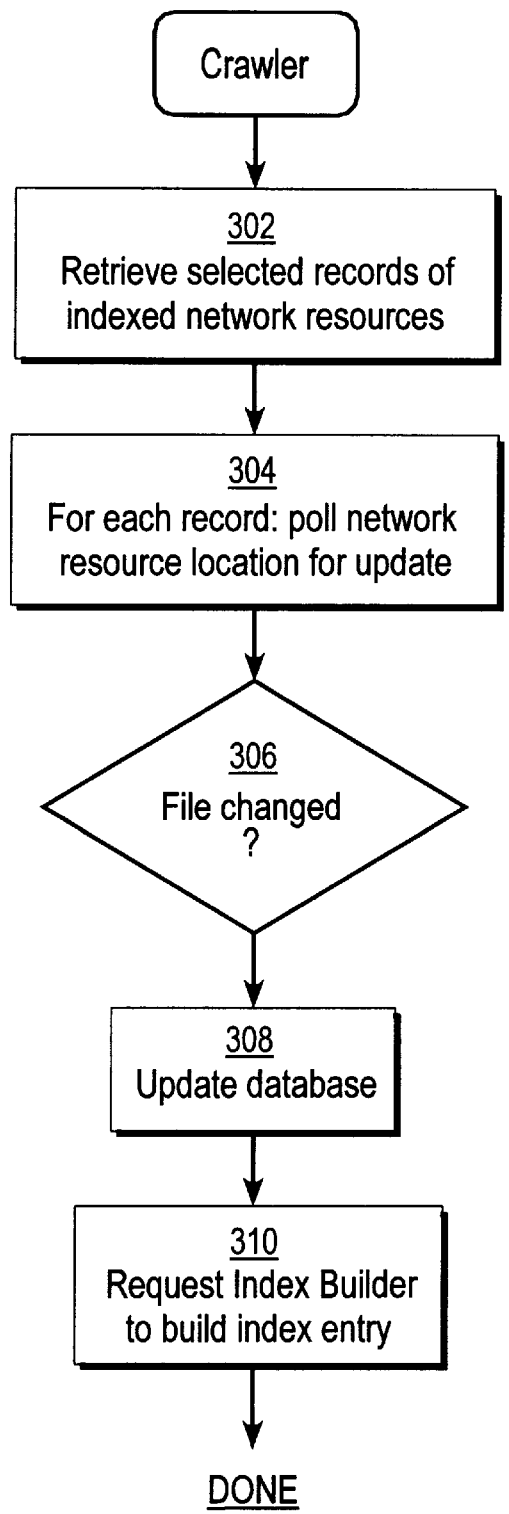
FIG. 3 is a flow diagram of a method of operating a crawler in the system of FIG. 1B.

FIG. 3 is a flow diagram of an embodiment of a method that is preferably carried out by the Crawler 24. In the preferred embodiment, the system includes a Scheduler process that triggers activation and execution of the Crawler 24. For example, the Scheduler stores a schedule of events. An event states that the Crawler 24 should execute every twenty-four hours. Upon the occurrence of a scheduled event, the Scheduler launches the Crawler 24.

In block 302, the Crawler 24 reads the database 12 of the Registry 10 and retrieves one or more rows or records that identify network resources that are indexed in the Index Files 34. The protocol for selecting the rows or records is not critical, and several different schemes can be used. For example, the Crawler 24 can select all rows or records that have not been updated since the last time that the Crawler executed. Alternatively, the Crawler 24 can select all rows or records that have been created within a specified time frame or that are older than a particular number of days. In still another alternative, the Crawler 24 selects the least recently updated record. In a preferred embodiment, the system includes a mapping of real names to RNS file names and locations called the File Info table. The Crawler matches the selected rows to the File Info table and locates the network address, location or URL of the Name File associated with each real name, row or record.

For each of the selected rows or records, in block 304, the Crawler 24 polls the customer Web site that is represented by the row or record, searching for updates to the Name File 64 that is stored in association with that Web site. The polling step includes the steps of opening an HTTP connection to the Web site, requesting and receiving a copy of the Name File. The Crawler 24 parses the Name File, using an XML parser, to identify real name entries, and values within each real name entry, that specify the real name, network address, and descriptive information relating to network resources. An XML parser is commercially available from Microsoft Corporation.

For each entry in the Name File, as shown in block 306, the Crawler 24 tests whether the entry matches a row or record in the database 12. Thus, the Crawler 24 determines whether the contents of the Name File are different from entries in the database 12. If so, as shown in block 308, then the Crawler 24 updates the database 12, and requests the Index Builder to rebuild the index entry associated with the updated row or record in the database 12.

In this way, the Crawler 24 polls Web sites on the Internet 50 to locate customer sites that have updates. Because the Name Files are distributed across the network at numerous customer sites, each customer has the freedom and flexibility to modify its Name File at any desired time. The customer need not notify the real name system, because the Crawler 24 will eventually locate each change and update the database 12 accordingly. Thus, the Librarian 20 automatically monitors changes to Name Files distributed across the network, and periodically updates the Registry 10 with the change. Advantageously, customers or end users are not involved in updating the database 12; the Crawler 24 updates the database automatically.

In the preferred embodiment, a customer can instruct the Librarian 20 to immediately execute the Crawler 24 with respect to a specific Web site. In this way, changes to a particular Name File are immediately identified and loaded into the database. The customer activates immediate execution of the Crawler 24 by selecting the Live Update option from the top-level menu. In the preferred embodiment, the system also carries out, once weekly, a comprehensive update of the Index Files 34 based on the contents of the database 12. In this way, at least weekly, the Index Files 34 are rebuilt based on the current contents of the database 12.

In an alternate embodiment, the Crawler 24 also validates each of the network resource locations that are identified in each Name File. For example, the Crawler 24 attempts to connect to and load each network resource that is identified in a Name File entry. If an error occurs, an appropriate email message is composed and sent to the contact person of the organization that registered the Name File. The email message advises the contact person that the network resource location in the Name File is invalid.

Index Builder

Figure 4:
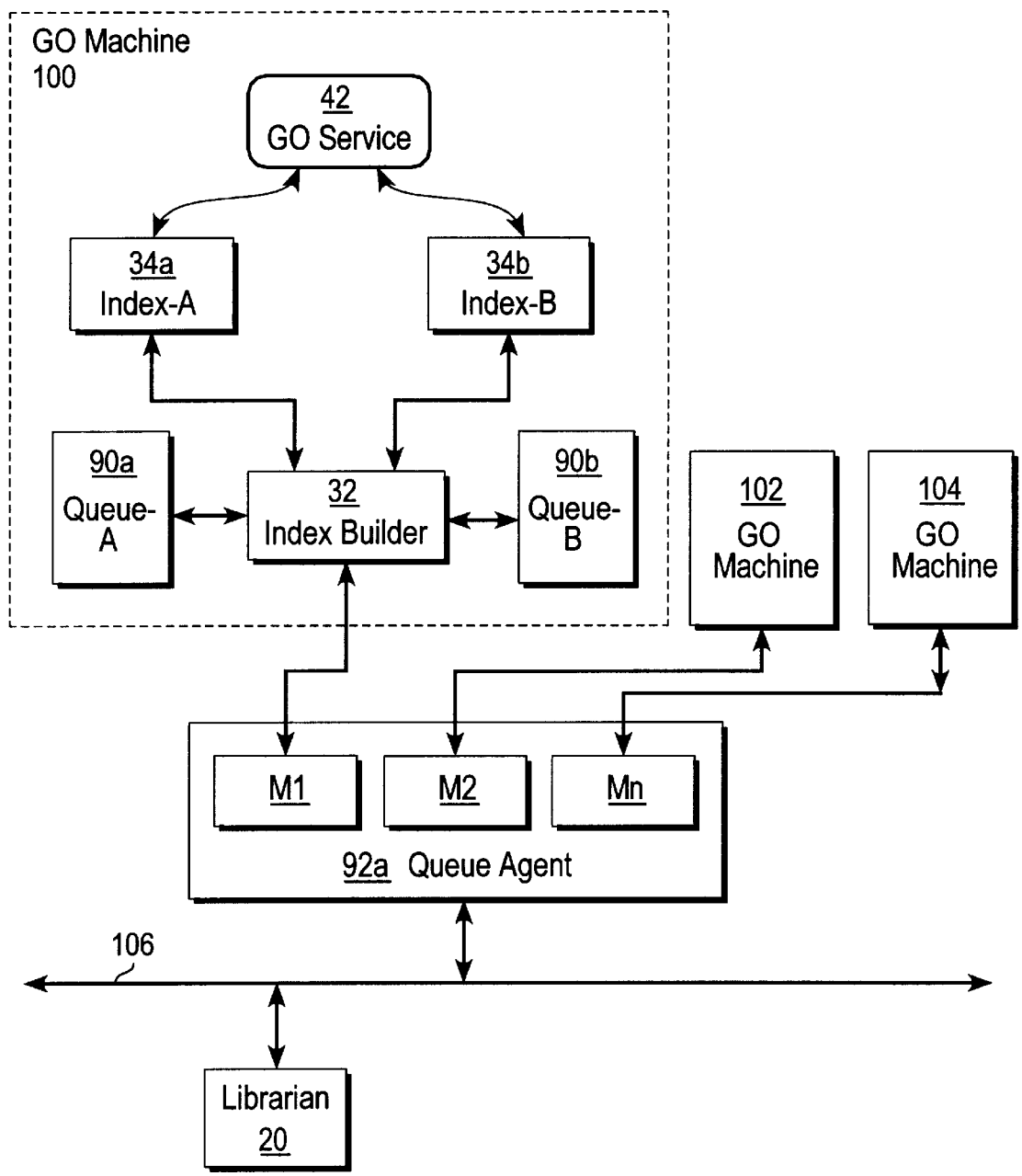
FIG. 4 is a block diagram of an index builder service of the system of FIG. 1B.

The Index 30 comprises an Index Builder 32 and Index Files 34. The Index Builder 32 is a software program or process that operates in two modes. In the first mode, a Reconstructor process of the Index Builder 32 periodically polls the database 12, discovers changes to the database, and indexes the changed real name records in the Index Files 34. In a second mode, the Index Builder 32 updates the Index Files 34 in real time, based upon a queue of requests to update the indexes. FIG. 4 is a block diagram of a preferred embodiment of the Index Builder 32. Computers labeled GO Machines 100, 102, 104 each run an instance of the Index Builder 32. Each GO Machine 100, 102, 104 is associated with a network interface process M1, M2, Mn of a Queue Agent 92a. The Queue Agent 92a is coupled to a network 106, such as a local area network, and receives requests to build index entries from the Librarian 20. The Queue Agent 92a propagates a copy of each request to one of the network interfaces M1, M2, Mn, which forwards the request to its associated GO Machine 100, 102, or 104. This architecture is highly responsive to external queries, and is fault-tolerant.

Within each GO Machine, the Index Builder 32 is coupled to a pair of queues 90a, 90b and a pair of indexes 34a, 34b. The GO Service 42 can access either of the indexes 34a, 34b, but always accesses only one of the indexes at a time. The Resolver 40 is omitted from FIG. 4 for clarity, but it should be understood that the GO Service 42 accesses each index 34a, 34b through a Resolver 40 process.

It is important for the GO Service 42 to be in constant communication with one index or the other. Accordingly, using the architecture shown in FIG. 4, the Index Builder builds the indexes using the following process. The GO Service is placed in contact with index 34b and instructed to communicate real name resolution requests only to index 34b. As index build requests arrive from the Queue Agent 92a at the Index Builder 32, the Index Builder 32 adds the requests to both of the queues 90a, 90b. When one of the queues is sufficiently full, for example, queue 90a, the Index Builder 32 sequentially removes entries from the queue, in first-in-first-out order, and updates the index 34a with each queue entry. Concurrently, if any new index build requests are received, they are routed to both of the queues. When the queue 90a is empty and the index 34a is fully updated, the Index Builder 32 instructs the GO Service 42 to communicate real name resolution requests only to index 34a. The Index Builder 32 then removes entries only from queue 90b and updates only index 34b from that queue. Thus, the Index Builder 32 can add index entries to either of the queues 90a, 90b, but always updates only one index at a time using the contents of only one of the queues at a time. The queue with which the Index Builder 32 communicates is always the opposite or complement of the indexes 34a, 34b with which the GO Service 42 is currently communicating. In this way, the GO Service 42 constantly communicates with an index, and the Index Builder 32 can update the index in real time without disrupting name resolution operations.

Preferably, the index build requests comprise an identifier, called a FileId, of a file or row that is mapped in the File Info table described above. The Index Builder 32 looks up the FileID in the File Info table and retrieves all entries in the database that match the FileID. Each database entry includes a unique identifier that is associated with a network resource that is described in the database entry. The unique identifiers are generated using a sequence facility of the database server. Based on the unique identifier, for database entry that matches the FileID, the Index Builder retrieves a matching index entry. The information in the index entry is compared to the information in the build request. If the information in the build request is different, the index entry is updated. If the information in the build request indicates that the associated network resource has become inactive or unavailable in the network, the index entry is deleted.

To provide scalability, reliability, and rapid response, each of the GO Machines 100, 102, 104 has a similar configuration and operates in parallel. Although three GO Machines 100, 102, 104 are shown in FIG. 4 as an example, any number of GO Machines can be used in the system. In the preferred embodiment, a Scheduler process determines when the Index Builder 32 executes.

Resolver

Generally, the Resolver 40 functions as a runtime query interface to the metadata that is stored in the Registry 10. The Resolver 40 functions to receive real name requests from services 42, 44, 46, query the index 30 to identify network addresses corresponding to the real name requests, and respond to the services with the network addresses. The Resolver 40 is structured to respond rapidly to query operations and to service millions of requests per day. To maximize response time and ensure scalability, the Resolver 40 does not directly access the database 12 of the Registry 10 in responding to queries. Instead, the Resolver communicates with the Index 34 that is stored in fast main memory.

In the preferred embodiment, the Resolver 40 operates in any number of multiple instances R1, R2, Rn, each of which is associated with a service 42, 44, 46 that is making a request to the Resolver. The services 42, 44, 46 communicate with Resolver instances R1, R2, Rn using HTTP connections. Further, it is preferred to operate the computer hardware on which the Resolver 40 runs in a triple-redundancy configuration. This configuration provides rapid response to the requesting services 42, 44, 46 and provides reliability. Each instance R1, R2, Rn is implemented as an instance of a Web application that implements the Resolver. The services 42, 44, 46 communicate with Resolver instances R1, R2, Rn using HTTP connections.

Figure 5:
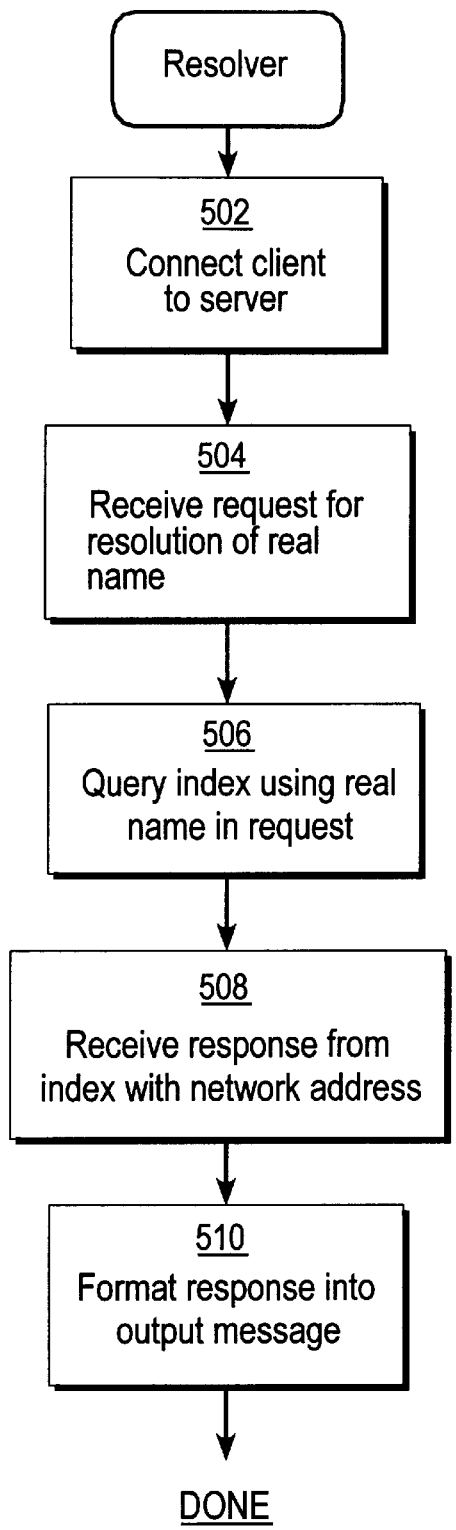
FIG. 5 is a flow diagram of a method of operating a resolver service in the system of FIG. 1B.

In one embodiment, an instance of the Resolver 40 is implemented as a dynamically linked library (DLL) that is integrated into the services 42, 44, 46. In the preferred embodiment each instance of the Resolver 40 is a detached, separate process or program that operates according to the method shown in FIG. 5. The Resolver 40 is implemented with one or more APIs that allow the development of services that use the Resolver, such as "yellow pages" and search services.

As shown in blocks 502–504, an external web client, server or browser, such as the client 70, accesses the Resolver 40. In one embodiment, the client 70 connects to the Resolver 40 using an HTTP connection. In block 502, the client 70 establishes an HTTP connection to the Resolver 40. In block 504, the client 70 provides a URL to the Resolver that requests the network address corresponding to a particular real name. For example, the URL is in the form http://www.resolver.com/resolve?rn=REAL_NAME. In a URL of this form, "http://" identifies the URL as an HTTP request, www.resolver.com is the server domain, and "resolve" is the name of a program running on that server domain that implements the resolver. The statement "rn= REAL NAME" passes the value "REAL NAME" to a parameter "rn" that is recognized by the resolver.

In another embodiment, the client 70 connects to one of the services 42, 44, 46 associated with an instance of the Resolver 40. The services 42, 44, 46 communicate with the client 70 to request and receive a real name.

Thus, in one of these ways, the Resolver 40 receives a real name requested by the client 70. In response, the Resolver 40 constructs a Qualifier object in main memory that contains the real name. In block 506, the Resolver connects to the Index 30 and submits a query requesting the network address or URL that corresponds to the real name in the request from the client 70. In the preferred embodiment, the query is submitted by sending a message containing the Qualifier object to an Index Store object. The Index Store object encapsulates or provides an abstract representation of the Index 30. The Index Store object executes an index query.

In block 508, the Resolver 40 receives a response from the Index 30 that contains the network address or URL that corresponds to the real name in the request from the client 70. In the preferred embodiment, the Index Store object returns an Entry Set object to the Resolver 40. The Entry Set object contains or references a set of one or more entries from the Index 30 that correspond to the requested real name. Each Entry Set object has a method that can supply the location or URL of a network resource described in an entry of the object.

The Index Store object also has logic for ordering entries in the Entry Set object based on a function of past usage. When the Entry Set object has just one entry, ordering is not needed. When the Entry Set object has more than one entry, a two-stage ordering process is carried out. First, the entries are ordered according to relevance. Second, entries having equal relevance are ordered based upon a function of the number of past resolutions for each entry.

For example, consider a query for the real name address "Microsoft." Assume that resolution of the query yields no exact match, but yields more than one inexact match, such as "Microsoft Excel" and "Microsoft Word". In the first stage of the ordering process, these two entries would be ranked against relevance criteria and re-ordered if one entry is determined to have greater relevance to the query than the other. The relevance criteria include, for example, the number of words in each entry, whether each entry contains the exact query term, etc. In this example, according to these criteria, each of the two entries has equal relevance; therefore, they are not re-ordered. In the second stage of the ordering process, the Resolver 40 retrieves statistical information about each entry from the Statistics Service described herein. The statistical information includes a usage value for each real name entry that is computed by applying a weighting function to a count of past resolutions for that real name. The weighting function operates to give more weight to recent resolutions for the real name than to resolutions that occurred in the distant past. The Resolver compares the usage values for each of the entries and re-orders the entries, if necessary, so that the entry having the highest-weight usage value is first in order in the Entry Set object.

In block 510, the Resolver 40 formats the response of the index into an output message. In a preferred embodiment, the Resolver 40 constructs an XML file containing the information in the response from the Index 30. In the preferred embodiment, the services 42, 44, 46 each are provided with an XML parser that can convert the XML file produced by the Resolver 40 into text or other information in a format that is usable by the client 70. Also in the preferred embodiment, each entry referenced in the Entry Set object contains a usage value that indicates the number of times that the entry has been resolved. The usage values are used to order the entries when they are displayed or otherwise used by one of the Services 42–46.

After each real name resolution, the Resolver 40 writes an entry in a log file 84 that describes the real name, the total number of times it has been resolved in the past including the current resolution, the IP address and domain name of the client or server that requested the current resolution, and the time at which the current resolution occurred.

In the preferred embodiment, the Index 30 and the Resolver 40 execute on the same physical computer, and the Index Files 34 are stored in main memory of that computer. This configuration improves response time of the Resolver 40 by providing it with high-speed access to the Index 30. It is contemplated that the Resolver 40 will respond to several tens of millions of real name resolution requests per day. Also in the preferred embodiment, the Index 30 and the Resolver 40 are implemented as a plurality of Component Object Model (COM) programmatic objects that communicate with the AltaVista runtime library using AltaVista's API. The AltaVista runtime library is commercially available for license from Digital Equipment Corporation in the form of the AltaVista Software Development Kit (SDK).

In an alternate embodiment, the Resolver 40 is capable of distinguishing among network addresses that refer to resources located on the Internet, an internal business network or "intranet", and an externally accessible internal business network or "extranet". In an intranet environment, the Resolver 40 accesses a Registry 10 that is located within the organization that owns and operates the Resolver. The Registry 10 stores resource information that identifies intranet resources. The Resolver 40 resolves real names entered by the user into the locations of intranet resources, and navigates the user to them.

Services

The services 42, 44, 46 can be implemented in several variations. In one embodiment, the GO service 42 is a computer program that is installed into or attached to the browser 74 of the client 70. For example, the GO service 42 is installed into the client 70 as a plug-in to the browser 74. The user downloads the GO service 42 from a central distribution site and stores the service on the client 70. The user executes an installation program that installs the service into the browser 74. Once installed, the GO service 42 intercepts network resource names entered by the user into the browser 74 and resolves the names into network addresses that are usable by the browser 74.

Figure 6:
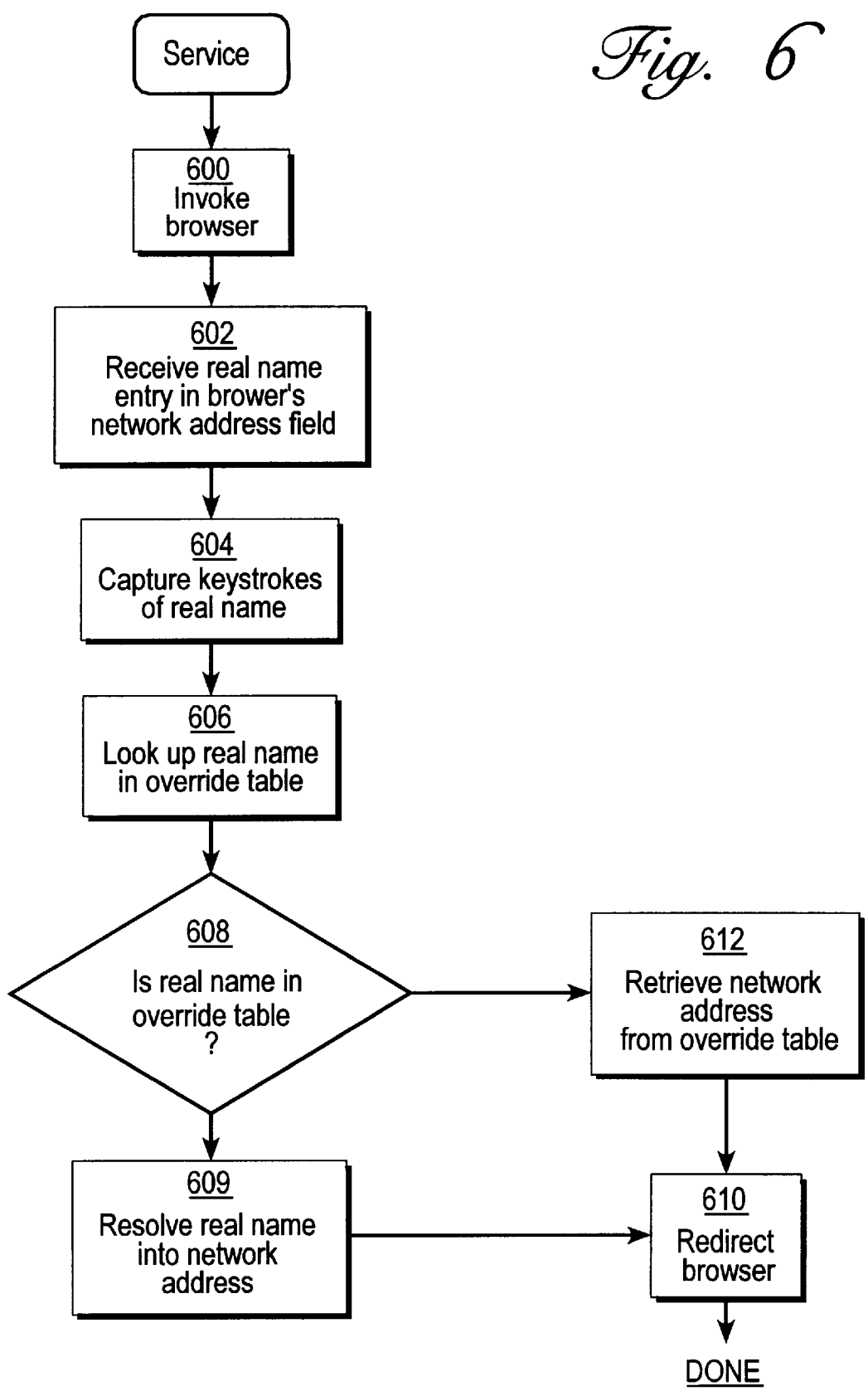
FIG. 6 is a flow diagram of a method of operating a name finding service in the system of FIG. 1B.
Figure 10:
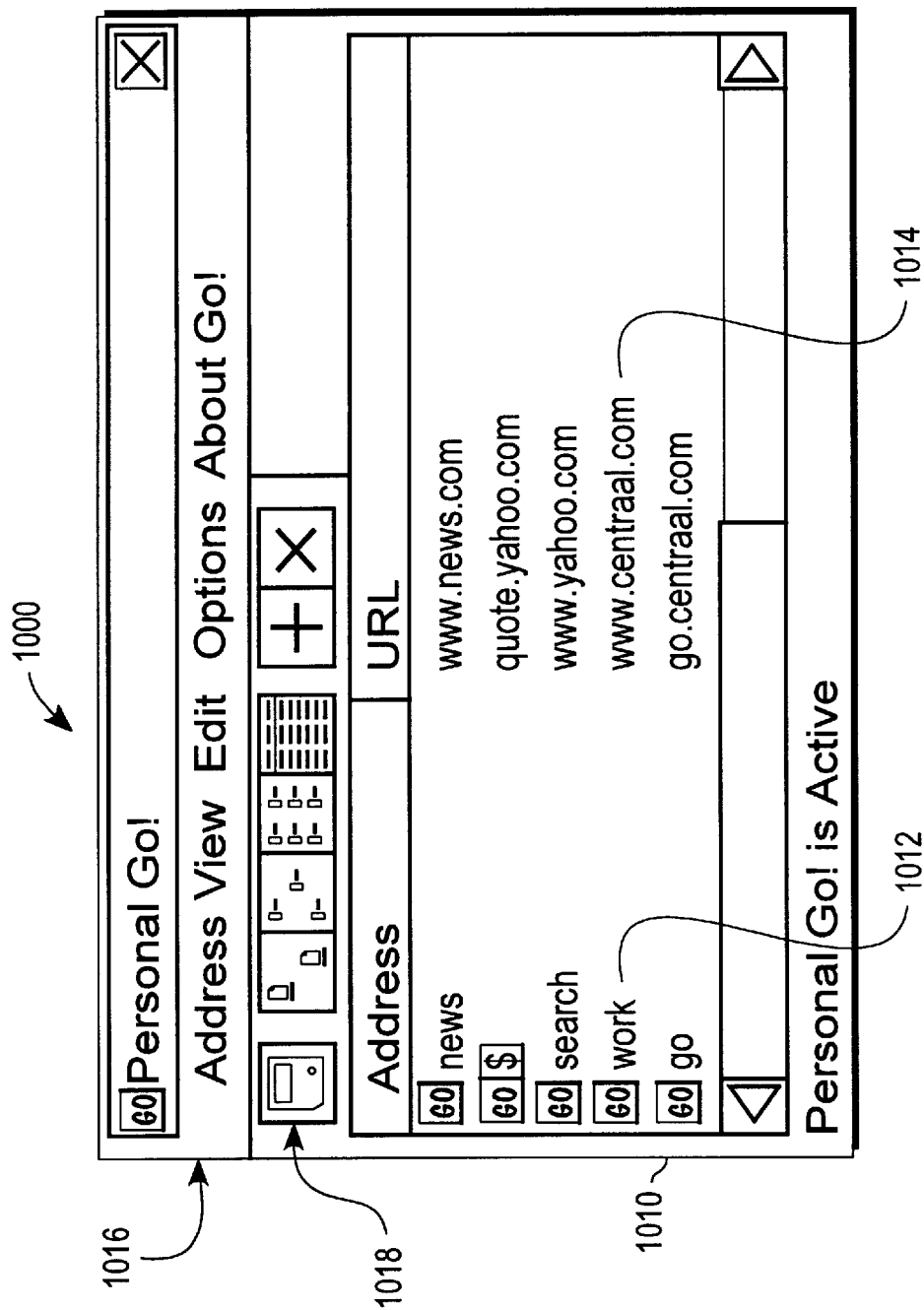
FIG. 10 is a block diagram of a user interface display generated by a navigating service.

FIG. 6 is a block diagram of a method of operating the GO service 42 in this configuration. FIG. 10 is a diagram of a user interface display 1000 generated by the GO service 42 in this configuration. In block 600, the user invokes or initiates execution of the browser 74. The browser 74 has a URL data entry field into which a user customarily types a network address of a document to be retrieved and displayed by the browser, such as a URL. In block 602, the user enters a real name into the network address data entry field. In block 604, the GO service 42 captures all keystrokes that are typed by a user into the network address data entry field of the browser 74 and thereby receives the real name entered by the user.

In block 606, the GO service 42 looks up the real name entered by the user in an override table 76 stored in the client 70. The override table 76 persistently stores mappings of real names to network addresses or URLs. The mappings are established by the user or the client 70, using a function of the GO service 42 to initially set up and update the override table 76. The override table 76 is stored on the client 70, for example, on the hard disk or other non-volatile storage device of the client 70.

The override table 76 provides a way for the user to establish a personal list of mappings of real names to network addresses. Thus, the override table 76 can be used as a "personal address file". For example, a user can establish an entry in the override table 76 that maps the symbol "$" to the domain name "quote.yahoo.com". Thereafter, when the user enters the symbol "$" into the network address data entry field of the browser, the GO service 42 will cause the browser to retrieve the resource named "quote.yahoo.com". Using the override table 76, the user also can establish an explicit mapping between a real name which, if submitted to the Resolver 40, would resolve to a list of network addresses.

As shown in FIG. 10, the override table 76 is displayed in an address table pane 1010 of the user interface display 1000. Real names of network addresses are displayed in a name column 1012, and corresponding network addresses are displayed in a network address column 1014. Descriptions of the real names are displayed in a description column. The user interface display includes a menu bar 1016 and function buttons 1018. The menu bar 1016 has a plurality of keywords (Addresses, View, Edit, Options, About Go!) that provide access to a drop-down menu associated with each of the functions identified by the keywords. The function buttons 1018 are used for rapidly selecting functions provided in the drop-down menus.

The Address drop-down menu provides functions named Close, Save, Activate, and Exit. The Close function closes the user interface display 1000 and terminates the service. The Save function saves the real names and corresponding network addresses in a file. The View drop-down menu provides functions named Large Icons, Small Icons, List, and Details. The functions of the View drop-down menu change the form of display used in the address table pane 1010. For example, when the Large Icons and Small Icons options are selected, respectively, the display shows each entry in the override table 76 as a large or small icon. When the List option is selected, the override table 76 is displayed in the form of a simplified list that shows only the real name associated with each entry. When the Details option is selected, the override table 76 is displayed as shown in FIG. 10, in the form of a detailed list.

The Edit pull-down menu has functions named Insert and Delete. The Insert function enables a new entry to be added to the override table 76. When the Insert function is selected, the service displays a pop-up window and prompts the user to enter a real name, URL or location identifier, and description. The pop-up window also has SAVE and CANCEL function buttons. When appropriate data is entered, the user clicks on the SAVE function button to add a new entry to the override table 76.

The Options pull-down menu provides functions that access other features of the service. For example, a Resolver option is provided that enables the user to change the resolution mechanism used by the service from the Resolver 40 to an external domain name resolution service available over the Internet 50.

If the real name is not in the override table 76, as tested in block 608, then control is passed to block 609. In block 609, the service 42 requests the Resolver 40 to resolve the network resource name received at the browser into a network address. For example, the service 42 constructs a URL that references a pre-determined location of the system that implements the Resolver 40. The URL contains, as a parameter to be passed to the Resolver 40, the network resource name received at the browser. The service 42 opens an HTTP connection from the client 70 to the Resolver 40 using the URL that contains the network resource name. The Resolver 40 extracts the value of the network resource name from the URL, and carries out the resolution process described above. The Resolver 40 then returns one or more network resource location values in an HTTP message to the browser 74.

If one network resource location value is received from the Resolver 40, then in block 610, the GO service 42 redirects the browser 74 to the network address found by the Resolver 40. For example, the service 42 extracts the network resource location value from the HTTP message received from the Resolver 40, and passes the value to functions of the browser 74 that can load and display Web pages. The browser 74 then loads and displays the file or page located at the network address in conventional manner.

Alternatively, if more than one network resource location value is received from the Resolver 40, then in block 610 the service displays a list of the network resource location values. The results are displayed in an order, from most prior resolutions to least prior resolutions, based on the resolution values compiled and stored by the Statistics Service 82. In another variation, the service returns to the client 70 an HTTP response containing an XML in which the results of the query are stored.

In an alternate embodiment, the GO service 42 is implemented as a Web application that runs on a dedicated Web server. To locate a network resource, the client 70 connects to the GO Web server using a predetermined network address or URL. In response, the Web application of the GO service 42 displays a Web page comprising a form with a data entry field. The end user types the real name of a network resource into the data entry field. The GO server 42 locates the network resource in the manner described above.

In another alternate embodiment, the GO service 42 is linked to a button or panel that is embedded in a Web page of an external Web server. The button or panel is anchored to a network address or URL that invokes the GO service 42 when the button or panel is selected by a user viewing the external Web server. This configuration provides a way to enter real names that does not require use of a browser.

If the test of block 608 is affirmative, then the network resource name entered by the user is located in the override table 76. In that case, as shown in block 612, the service 42 retrieves the corresponding network resource location from the override table 76. The service 42 then redirects the browser to the network resource at that location.

In yet another alternate embodiment, the GO Service 42 includes a mechanism to detect and respond to the natural language being used by the client 70 that contacts and provides a query to the GO Service. Assume the computer that is running the GO Service 42 operates using UTF-8 character set encoding and the English language, whereas the client 70 is using the Japanese language and a different character set encoding. When the GO Service 42 sends a Web page to the client 70 that contains the real name entry form, the Web page includes a hidden field that stores a pre-determined text string. The client 70 receives the Web page, and its browser or operating system converts the Web page to the character set that it uses. The user of the client 70 enters a real name into the Web page and submits it to the GO Service 42. The GO Service 42 receives the Web page, extracts the value of the hidden field, and compares the hidden field value to a table or mapping of hidden field values to character set encodings and languages. The GO Service 42 retrieves the corresponding character set encoding and language. Based on the language, the GO Service 42 selects a resource having a matching Language value in the metadata section 906 of the resource. In this way, the system transparently determines the language of the client that originates a query, and supplies a resource that is appropriate to that language.

In another alternate embodiment, the GO Service 42 and the Resolver 40 use the values of the metadata in the Name File 64 associated with resources to respond to advanced queries. For example, assume that United Airlines registers a Name File 64 that describes resources in several different languages such as English, French, and Japanese. A user desires to locate a Web site affiliated with United Airlines that is located in France or prepared in the French language. The user enters the words "United Airlines France" into the GO Service 42. The Resolver 40 attempts to match the words to the Description, Region, and Language fields of the metadata section 906 associated with the United Airlines Name File 64. The Resolver 40 and the Go Service 42 redirect the user's browser to a United Airlines site located in France.

In an alternate embodiment, when the GO Service 42 is implemented as a browser plug-in installed in the client 70, the GO Service provides character encoding information to the Resolver 40. To obtain the character encoding currently used on the client 70, the GO Service 42 calls an operating system function of the operating system that runs on the client 70. The GO Service 42 attaches the character encoding information to the URL that is used to return the user's query to the Resolver 40. In this way, the Resolver receives information indicating the language and character set currently used by the client 70, and can respond with a network resource that is appropriate to that language.

In another alternate embodiment, the computer system further includes a microphone coupled to an analog-to-digital converter. The analog-to-digital converter is coupled through an appropriate interface to the bus of the computer system. Under control of driver software or another appropriate application program, the analog-to-digital converter receives an analog audio input signal from the microphone and converts the signal to a digital representation of the signal. The driver or application program receives the digital representation and converts it into a phoneme, string of words, keyword, or command for the GO Service 42. The converted digital representation is used by the GO Service 42 as input, as a substitute for input from the keyboard or mouse. Thus, a user can view the user interface display 1000 and speak words into the microphone to command the GO Service 42 to locate a particular network resource. In this way, the user can navigate the Web using spoken words.

Figure 9:
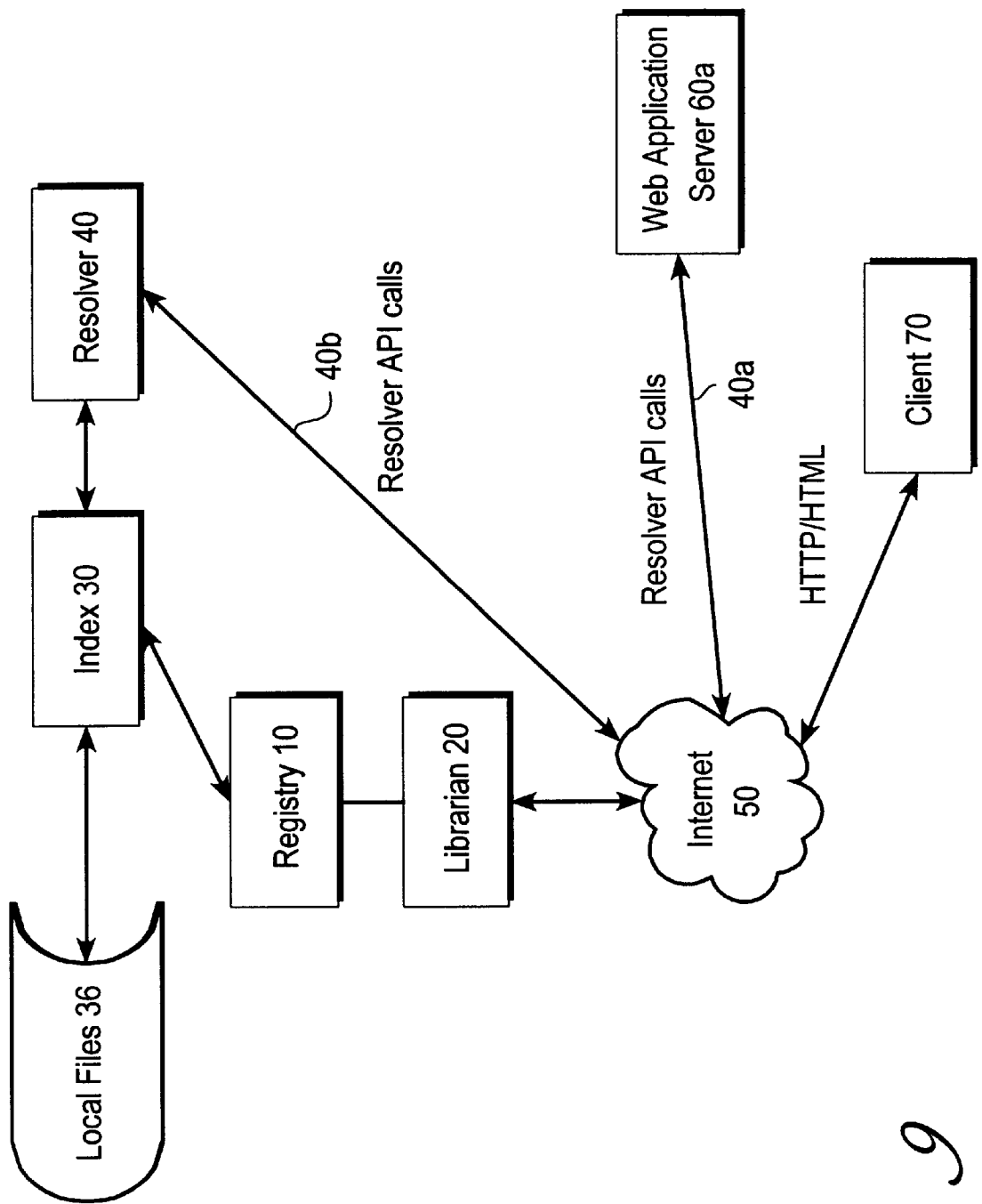
FIG. 9 is a simplified block diagram of a resolution and navigating system.

Another alternate embodiment is shown in FIG. 9. A Service is implemented in the form of a Web server or middle-tier Web application server 60a. The Web application server 60a communicates to the client 70 using HTTP messages through the Internet 50. The Web application server 60a includes a Common Gateway Interface (CGI) script processor, an application server such as Netscape's Kiva, Microsoft's Active Server, or Apple's WebObjects®.

An application program running on the Web application server 60a communicates with the Resolver 40 through the Internet 50 over paths 40a, 40b using CGI scripts to generate HTTP requests and responses. The Web application server 60a uses calls to functions provided by the API of the Resolver 40 to communicate along paths 40a, 40b. Using this structure, the Web application server 60a issues requests containing queries to the Resolver 40. In response, the Resolver 40 evaluates the query, queries the Index 30, and creates a set of metadata for all Index entries reflecting Web pages that match the query. The set of metadata is packaged as an XML file and delivered to the Web application server 60a by the Resolver 40. The Web application server 60a has an XML parser that can parse the XML code in the XML file. Based on the parsed XML code, the Web application server 60a creates one or more HTML documents and delivers the HTML documents to the client 70. The client 70 displays the HTML documents to the end user.

Statistics Service

As described above in connection with the Resolver 40, each time a real name resolution is carried out by the Resolver, it writes a log file entry. The system includes a Statistics Service 82 that is responsible for reading the log file and loading information from the log file into the Index Files 34.

In the preferred embodiment, the Statistics Service 82 operates periodically on scheduled basis. The Statistics Service 82 reads each record of the log file and constructs an index object based on the information in the log file. The Statistics Service 82 then sends a message to the Index Builder 32 that requests the Index Builder to persistently store the values in the Index Files 34. In response, the Index Builder 32 stores the values in the Index Files 34.

The top-level menu page of the system has hyperlinks that enable the user to access statistics and billing functions.

Figure 7A:
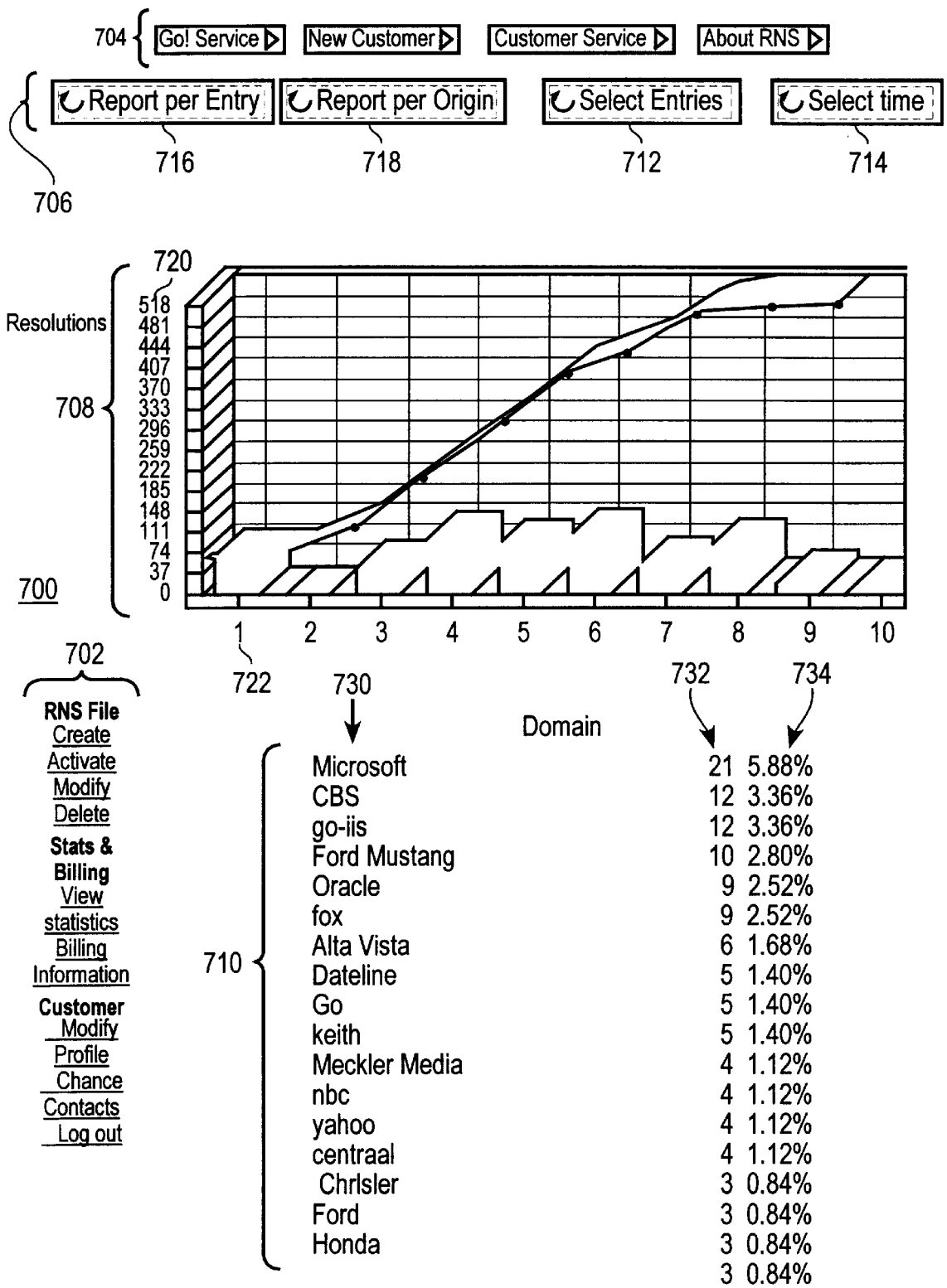
FIG. 7A is a diagram of an exemplary statistics report page generated by the system of FIG. 1B.

When the Statistics & Billing/Statistics option is selected, the system generates a Web page 700 in the form shown in FIG. 7A. The Web page 700 has a list 702 of top-level options. A set of function buttons 704 enable the user to establish other global functions such as resolving an address, entering new customer information, obtaining customer service, and learning more information about the real name system.

Report function buttons 706 enable the user to access report generation functions of the system. In an embodiment, the report function buttons 706 include a Select Entries button 712, a Select Time button 714, a Report per Entry button 716, and a Report per Origin button 718.

The Select Entries button 712 is used to identify a range of entries within a Name File for which statistics are to be generated. When the user selects the Select Entries button 712, the system reads the Name File on the server having an IP address matching the IP address of the user's current domain. The system parses the Name File and displays a list of all the real names in a new Web page that is sent to the client 70. The Web page displays a radio button adjacent to each of the real names in the list. By clicking on the radio button and then submitting the Web page to the system, the system will provide statistical information for all the selected real names in all reports that are generated later.

The Select Time button 714 is used to identify a time frame for which statistics are to be generated. When the user selects the Select Time button 714, the system generates a new Web page and sends it to the client 70. The Web page includes a form into which the user enters a starting date and an ending date. When the user submits the filled-in page to the system, the system receives and stores the date values. When reports are generated thereafter, the reports will contain statistical information for resolutions of real names that occurred within the specified dates.

The Report per Entry button 716 is used to generate a report and graph showing all real name resolutions that have occurred for each real name entry defined in the current Name File. When the Report per Entry button 716 is selected, the system reads statistical information that is stored in the statistical tables of the database 12 for each of the real names that are defined in the current Name File. The system generates a graph and a chart of the statistical information, and generates a Web page containing the graph and chart.

FIG. 7A is an example of a Web page generated in this manner. The graph pane 708 shows an exemplary bar graph. Each bar in the bar graph represents a real name defined in the current Name File. The vertical axis 720 identifies the number (in thousands) of resolutions of each real name. The horizontal axis 722 identifies each name for which statistics information is reported. The statistics pane 710 comprises a real name column 730, a quantity of resolutions column 732, and a percentage column 734. The real name column 730 lists each real name that is defined in the current Name File. The quantity of resolutions column 732 gives the number of resolutions of that real name that have occurred within the currently defined time period. The percentage column 734 indicates, for each real name, the percentage of total resolutions represented by the resolutions of that real name.

Figure 7B:
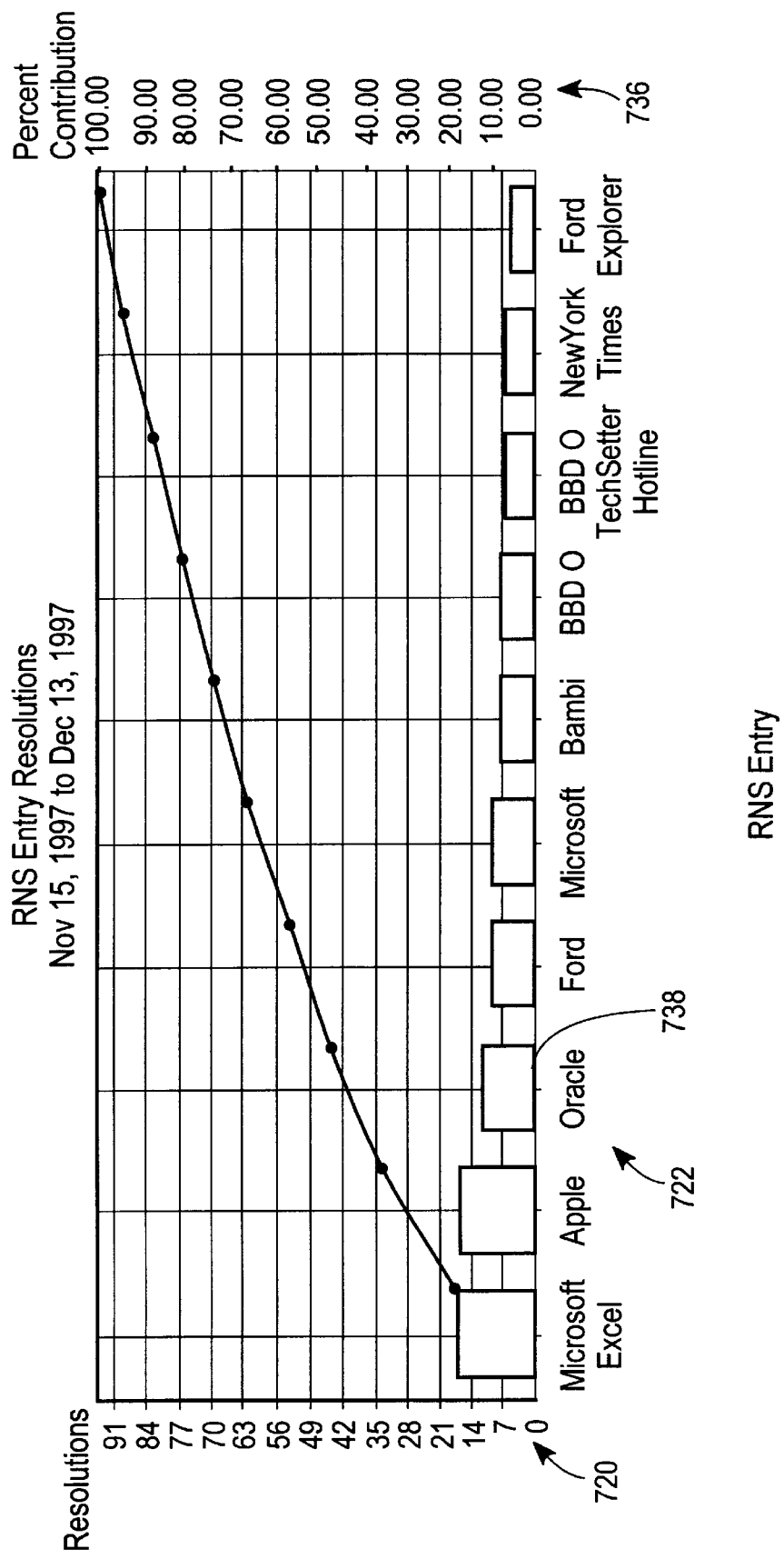
FIG. 7B is a diagram of another exemplary statistics report page generated by the system of FIG. 1B.

FIG. 7B is an example of another type of graph generated by the statistics service. The vertical axis 720 shows the number of resolutions of each real name. The horizontal axis 722 comprises a plurality of bars 738, each bar associated with a real name. The bar represents the number of resolutions of that real name. A second vertical axis 736 displays a number indicating the percentage of total resolutions carried out by the system that is represented by each real name shown in the horizontal axis 722.

In an embodiment, a fee is charged by the owner of the real name system to end users or customers who register real names in the Registry 10. The Librarian 20 records a charge against the account of the user when a new entry is submitted to the system using the Registration Service 22. In another embodiment, end users or customers who register real names in the Registry 10 pay a fee to the owner of the real name system for each resolution executed by the Resolver 40 in response to a third-party request. The Resolver 40 records a charge against the account of the user when each resolution is completed. In these embodiments, the account information and charges are logged and accumulated in tables of the database 12. Periodically, an external billing application reads the charge and account tables of the database 12 and generates invoices that are sent to the user. The Statistics & Billing/Billing Information option of the top-level option list 702 enables the user track and monitor, in real time, the user's credits and payments for registered real name entries, as well as resolution fees. When the Billing Information function is selected, the system reads the charge and account tables of the database 12 and generates a report, in a Web page, summarizing the charges to the customer. The Web page is delivered to the client 70 and displayed by it.

Hardware Overview

Figure 8:
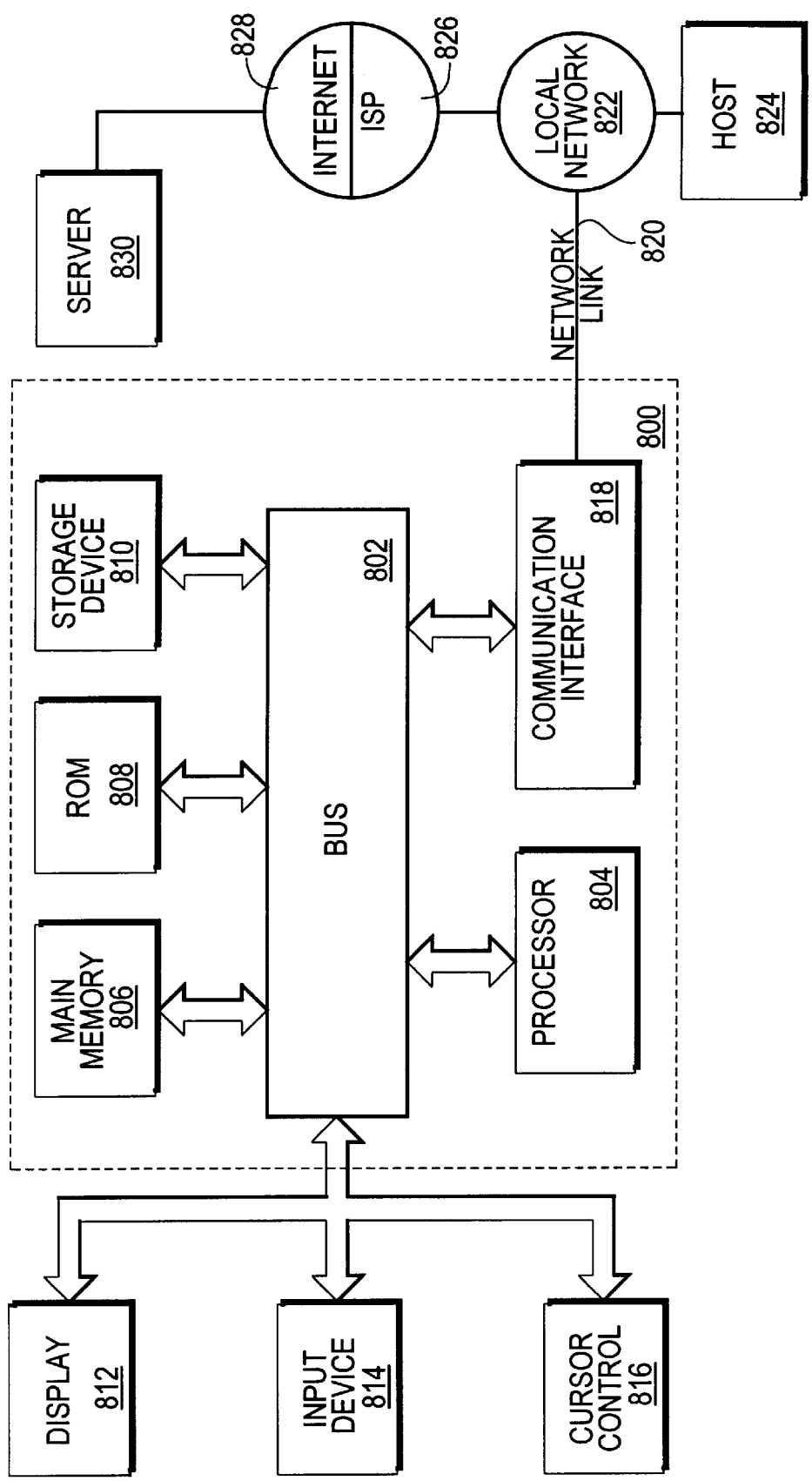
FIG. 8 is a block diagram of a computer system that can be used to implement the present invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for providing a language-independent network resource naming system. According to one embodiment of the invention, language-independent network resource naming is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector coupled to bus 802 can receive the data carried in the infra-red signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for a language-independent network resource naming system as described herein.

The received code may be executed by processor 804 as it is received, and/or stored in storage device 810, or other non-volatile storage for later execution. In this manner, computer system 800 may obtain application code in the form of a carrier wave.

Variations; Advantages

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

We claim:

1. A method of locating a resource that is stored in a location in a network that is identified by a location identifier, comprising the steps of:

storing, in a metadata registry in a first storage device, metadata that describes the resource in association with the location identifier of the resource;

receiving a request to locate the resource, the request containing an element of the metadata;

retrieving the location identifier associated with the resource from the metadata registry based on the element;

retrieving the resource over the network using the location identifier;

storing a natural language name for the resource in the metadata;

receiving a request to locate the resource based on the natural language name;

retrieving the location identifier associated with the natural language name from the metadata registry using the natural language name;

storing the natural language name in association with the location identifier in a name file in a second storage device associated with the resource;

retrieving the name file;

parsing the name file;

building an index entry based on the values parsed from the name file and storing the index entry in an index of the metadata registry by:

establishing, in a memory, a first index, a second index, a first queue associated with the first index, and a second queue associated with the second index;

receiving a request to build an index entry based on the values parsed from the name file;

selecting the first queue and storing the request in the first queue;

when the first queue is sufficiently full, storing the contents of the first queue in the first index, and concurrently selecting the second queue and storing a subsequent request to build an index entry in the second queue.

2. A method of locating a resource that is stored in a location in a network that is identified by a location identifier, comprising the steps of:

storing, in a metadata registry in a first storage device, metadata that describes the resource in association with the location identifier of the resource;

receiving a request to locate the resource, the request containing an element of the metadata;

retrieving the location identifier associated with the resource from the metadata registry based on the element;

retrieving the resource over the network using the location identifier;

storing a natural language name for the resource in the metadata in association with the location identifier in a name file in a second storage device associated with the resource;

receiving a request to locate the resource based on the natural language name;

retrieving the location identifier associated with the natural language name from the metadata registry using the natural language name;

retrieving the name file, parsing the name file; building an index entry based on the values parsed from the name file; and storing the index entry in an index of the metadata registry;

establishing, in a memory, a first index, a second index, a first queue associated with the first index, and a second queue associated with the second index;

receiving a request to build an index entry based on the values parsed from the name file; selecting the first queue and storing the request in the first queue, and when the first queue is sufficiently full, storing the contents of the first queue in the first index, and concurrently selecting the second queue and storing a subsequent request to build an index entry in the second queue;

alternately selecting the first queue and the second queue in response to successive requests to build an index entry.

3. A method of locating a resource that is stored in a location in a network that is identified by a location identifier, comprising the steps of:

storing, in a metadata registry, metadata that describes the resource in association with the location identifier of the resource, by the steps of: receiving a client identifier of a client associated with the resource; generating values for the metadata that describe the resource, the location identifier, and the client identifier; and storing metadata in a persistent storage device associated with the client;

receiving a request to locate the resource, the request containing an element of the metadata;

retrieving the location identifier associated with the resource from the metadata registry based on the element;

retrieving the resource over the network using the location identifier;

instructing the client to store the metadata in a particular authorized location in the persistent storage device;

building an index entry based on the values parsed from the name file; and storing the index entry in an index of the metadata registry by establishing, in a memory, a first index, a second index, a first queue associated with the first index, and a second queue associated with the second index by establishing the first queue in a first server and establishing the second queue in a second server that is separate from the first server.

\* \* \* \* \*